United States Patent
Iyengar

(10) Patent No.: US 11,443,513 B2
(45) Date of Patent: Sep. 13, 2022

(54) SYSTEMS AND METHODS FOR RESOURCE ANALYSIS, OPTIMIZATION, OR VISUALIZATION

(71) Applicant: Prashanth Iyengar, Irvine, CA (US)

(72) Inventor: Prashanth Iyengar, Irvine, CA (US)

(\*) Notice: Subject to any disclaimer, the term of this patent is extended or adjusted under 35 U.S.C. 154(b) by 0 days.

(21) Appl. No.: 17/403,860

(22) Filed: Aug. 16, 2021

(65) Prior Publication Data

US 2021/0374423 A1  Dec. 2, 2021

Related U.S. Application Data

(63) Continuation of application No. PCT/US2020/031638, filed on May 6, 2020.
(Continued)

(51) Int. Cl.
*G06V 20/40* (2022.01)
*G06Q 10/06* (2012.01)
(Continued)

(52) U.S. Cl.
CPC ......... *G06V 20/46* (2022.01); *G06Q 10/0633* (2013.01); *G06Q 10/0639* (2013.01);
(Continued)

(58) Field of Classification Search
CPC ...... G06V 20/46; G06V 10/255; G06V 10/30; G06V 20/41; G06V 20/52; G06V 20/44;
(Continued)

(56) References Cited

U.S. PATENT DOCUMENTS 9,605,529 B1  3/2017  Venter et al.
10,768,076 B1  9/2020  Oostendorp et al.
(Continued)

FOREIGN PATENT DOCUMENTS

IN  200803306  7/2010
IN  201941026099  1/2021
(Continued)

OTHER PUBLICATIONS

Sun et al. "Optimizing resource utilization of a data center." In: IEEE Communications Surveys 41 & Tutorials. Apr. 25, 2016 (Apr. 25, 2016) Retrieved on Jul. 14, 2020 (Jul. 14, 2020) from <http://www.unm.edu/-sunxiang/Publication/0ptimizing%20Resource%20Utilization%20of%20a <http://www.unm.edu/-sunxiang/Publication/0ptimizing%20Resource%20Utilization%20of%20a> %20Data%20Center.pdf>.
(Continued)

*Primary Examiner* — Amara Abdi
(74) *Attorney, Agent, or Firm* — Fox Rothschild, LLP; Kari L. Barnes

(57) ABSTRACT

A system and method for distributed surveillance of an area to monitor a process and visual effects of the process. Exemplary methods include, among others, asset effectiveness, issue identification and prioritization, workflow optimization, monitoring, estimation, verification, compliance, presentation, and/or identification for a given process. Such application may include, but are not limited to, manufacturing, quality control, supply chain management, and safety compliance.

20 Claims, 19 Drawing Sheets

Related U.S. Application Data

(60) Provisional application No. 62/967,037, filed on Jan. 29, 2020.

(51) Int. Cl.
| | |
|---|---|
| *G06T 7/00* | (2017.01) |
| *G06V 10/30* | (2022.01) |
| *G06V 10/20* | (2022.01) |
| *G06V 20/52* | (2022.01) |
| *G06Q 10/04* | (2012.01) |
| *G06Q 50/04* | (2012.01) |

(52) U.S. Cl.
CPC . *G06Q 10/06393* (2013.01); *G06Q 10/06395* (2013.01); *G06Q 10/063114* (2013.01); *G06T 7/0004* (2013.01); *G06T 7/0008* (2013.01); *G06V 10/255* (2022.01); *G06V 10/30* (2022.01); *G06V 20/41* (2022.01); *G06V 20/52* (2022.01); *G06Q 10/04* (2013.01); *G06Q 50/04* (2013.01); *G06T 2207/10016* (2013.01); *G06T 2207/30164* (2013.01); *G06T 2207/30232* (2013.01); *G06V 20/44* (2022.01); *G06V 2201/07* (2022.01)

(58) Field of Classification Search
CPC ........... G06V 2201/07; G06Q 10/0633; G06Q 10/0639; G06Q 10/04; G06Q 50/04; G06Q 10/0637; G06T 7/0004; G06T 7/0008; G06T 2207/10016; G06T 2207/30164; G06T 2207/30232; G06F 3/0481
See application file for complete search history.

(56) References Cited

U.S. PATENT DOCUMENTS

| | | | |
|---|---|---|---|
| 10,890,898 | B2 | 1/2021 | Akella et al. |
| 11,054,811 | B2 | 7/2021 | Akella et al. |
| 11,175,650 | B2 | 11/2021 | Akella et al. |
| 2003/0108117 | A1 | 6/2003 | Ketchum et al. |
| 2003/0128880 | A1 | 7/2003 | Akimoto et al. |
| 2006/0193498 | A1 | 8/2006 | Hartlove |
| 2008/0015786 | A1* | 1/2008 | Ramer .................. G06V 20/69 702/19 |
| 2008/0033738 | A1 | 2/2008 | Conard et al. |
| 2009/0060162 | A1 | 3/2009 | Lachhiramka |
| 2009/0088875 | A1 | 4/2009 | Baier et al. |
| 2010/0023151 | A1 | 1/2010 | Shieh et al. |
| 2010/0238174 | A1 | 9/2010 | Haub et al. |
| 2011/0004701 | A1 | 1/2011 | Panda et al. |
| 2011/0119588 | A1* | 5/2011 | Siracusano, Jr. .... G11B 27/034 715/723 |
| 2012/0101953 | A1 | 4/2012 | James et al. |
| 2012/0278051 | A1 | 11/2012 | Jiang et al. |
| 2014/0074850 | A1 | 3/2014 | Noel et al. |
| 2014/0307076 | A1 | 10/2014 | Deutsch |
| 2014/0328570 | A1* | 11/2014 | Cheng .................. H04N 21/233 386/241 |
| 2015/0086002 | A1 | 3/2015 | Jain et al. |
| 2015/0341212 | A1* | 11/2015 | Hsiao ...................... G06F 16/26 715/735 |
| 2016/0198079 | A1 | 7/2016 | Shishalov et al. |
| 2016/0207657 | A1 | 7/2016 | Petri et al. |
| 2017/0118539 | A1* | 4/2017 | Lokshin ................ G11B 27/28 |
| 2017/0160733 | A1 | 6/2017 | Oostendorp et al. |
| 2017/0278366 | A1 | 9/2017 | Burke et al. |
| 2017/0371505 | A1 | 12/2017 | Brocke et al. |
| 2018/0189731 | A1 | 7/2018 | Nossam |
| 2018/0349247 | A1 | 12/2018 | Hanes et al. |
| 2019/0137979 | A1 | 5/2019 | Akella et al. |
| 2019/0138381 | A1 | 5/2019 | Akella et al. |
| 2019/0138623 | A1 | 5/2019 | Akella et al. |
| 2019/0138674 | A1 | 5/2019 | Akella et al. |
| 2019/0138676 | A1 | 5/2019 | Akella et al. |
| 2019/0138880 | A1 | 5/2019 | Akella |
| 2019/0138905 | A1 | 5/2019 | Akella et al. |
| 2019/0138932 | A1 | 5/2019 | Akella et al. |
| 2019/0138967 | A1 | 5/2019 | Akella |
| 2019/0138971 | A1 | 5/2019 | Uggirala et al. |
| 2019/0138973 | A1 | 5/2019 | Akella et al. |
| 2019/0139441 | A1 | 5/2019 | Akella et al. |
| 2020/0074402 | A1 | 3/2020 | Adato et al. |
| 2020/0090110 | A1 | 3/2020 | Sewak et al. |
| 2020/0190963 | A1* | 6/2020 | Gooneratne ............ E21B 17/02 |
| 2020/0233932 | A1 | 7/2020 | Repaka et al. |
| 2021/0117684 | A1 | 4/2021 | Chaudhury et al. |
| 2021/0216777 | A1 | 7/2021 | Chaudhury et al. |
| 2021/0216952 | A1 | 7/2021 | Schumacher et al. |

FOREIGN PATENT DOCUMENTS

| | | |
|---|---|---|
| IN | 201941026100 | 1/2021 |
| IN | 201941026101 | 1/2021 |
| IN | 201941028832 | 1/2021 |
| IN | 201941028833 | 1/2021 |
| WO | 2018191555 A1 | 10/2018 |
| WO | 2019090264 A1 | 5/2019 |
| WO | 2019090268 A1 | 5/2019 |
| WO | 2019090274 A1 | 5/2019 |
| WO | 2021154320 A1 | 8/2021 |

OTHER PUBLICATIONS

Symbia Logistics. "Everything You Need To Know About Inventory Forecasting." Symbia Logistics article, Aug. 29, 2019 (Aug. 29, 2019) Retrieved on Jul. 15, 2020 (Jul. 15, 2020) from <https://www.symbia.com/blog/inventory-forecasting>.

* cited by examiner

| PRE-PROCESSED IMAGE (t=100s) CAMERA 1 | PRE-PROCESSED IMAGE (t=101s) CAMERA 1 |
|---|---|
| PRE-PROCESSED IMAGE (t=102s) CAMERA 1 | PRE-PROCESSED IMAGE (t=103s) CAMERA 1 |

FIG. 7A

| IMAGE (t=100s) CAMERA 1 | IMAGE (t=100s) CAMERA 2 |
|---|---|
| IMAGE (t=100s) CAMERA 3 | IMAGE SENSOR SIGNAL TRACE (t=100s) SENSOR 1 |

FIG. 7B

| IMAGE (t=100s) CAMERA 1 | IMAGE (t=101s) CAMERA 1 |
|---|---|
| IMAGE (t=101s) CAMERA 2 | IMAGE SENSOR SIGNAL TRACE (t=100s) SENSOR 1 |

SYSTEMS AND METHODS FOR RESOURCE ANALYSIS, OPTIMIZATION, OR VISUALIZATION

PRIORITY

This application claims priority as a continuation to international patent application number PCT/US20/31638, filed May 6, 2020, while claims priority to U.S. Provisional Application No. 62/967,037, filed Jan. 29, 2020, each of which is incorporated by reference in its entirety herein.

BACKGROUND

Many processes occur that require repetition or step-wise application of resources. For example, in conventional assembly line manufacturing, an object is created as a part, passes through different stations and additional components are built or received and then assembled to the part. Other processes that include repetitive actions may include quality inspections of finished products. Other processes may include inspections during field use, such as, for example, inspection of oil pipes for assessing defects or determining the need for repairs. Many inefficiencies arise in such system as one part of the line may be backed up, while other parts are not utilized, during such back up or otherwise.

Traditional approaches to optimize operations generally involve manual observation and inferences by Subject Matter Experts (SMEs) or other operational manager. For example, traditional approaches may involve optimizing operations outcomes like improving Operational Equipment Efficiency (OEE), by performing time studies. A subject matter expert or manager would manually monitor or track inefficiencies for a duration. Monitoring may include tracking machine up and down time, machine through put, amount of scrap or incidence of rework monitoring, etc. However, such processes are highly manual and require the presence of SMEs to observe, monitor, and collect data to infer root causes and then propose changes. Observations and studies to determine issues are done by sampling the process at various times of operation, which does not capture all variations in the process (e.g. material variation, machine performance variation, operator performance, etc.).

Traditional approaches may also incorporate automated systems that are highly reliant on hardware and optimizing aspects of OEE like improving machine up time. Internet of Things (IoT) sensors may be included through a machine process to track specific information, such as machine up and down time, asset tracking, etc. An approach relying on IoT sensors requires attaching sensors to almost every entity that needs to be monitored or moving the sensors between entities. Additionally, these sensors require periodic maintenance or replacement. In order to facilitate changing the location of the sensors or replace existing sensors with newer ones requires installation effort. This makes the process even harder to scale. The data generated by all of the sensors may be so vast that they require processing on site as transferring information to remote processing locations can be expensive. However, hardware processing resources are typically limited on site, and thus, the quality of inferences or analytics provided by the system is similarly limited. Many of the IoT sensors used in such systems are also generally wireless devices that may be affected by signal occlusion, fading, shadowing effects, which makes the sensors unreliable and the processing performed on such information inaccurate. In order to overcome the challenge of scale such systems are narrow in their application (e.g. predictive maintenance of machines) and do not cover all aspect of OEE improvements. Such systems are also narrow in the variety of root cause identification and prioritization of inefficiencies as the assessment is limited by the assumptions made in pre-identifying the entities to be monitored and tracked.

SUMMARY

Exemplary embodiments of the system and methods described herein may permit manufacturing and other process organizations to optimize business processes to drive better outcomes using a scalable and customizable platform including Internet of Things (IoT), Cloud processing, Augmented Intelligence (AI), Machine Learning (ML), Signal Processing algorithms, and combinations thereof.

FIGURES

FIGS. 4-7C illustrate exemplary processes describing the pre-processor and aggregation algorithms described in FIG. 2.

Figure 10:
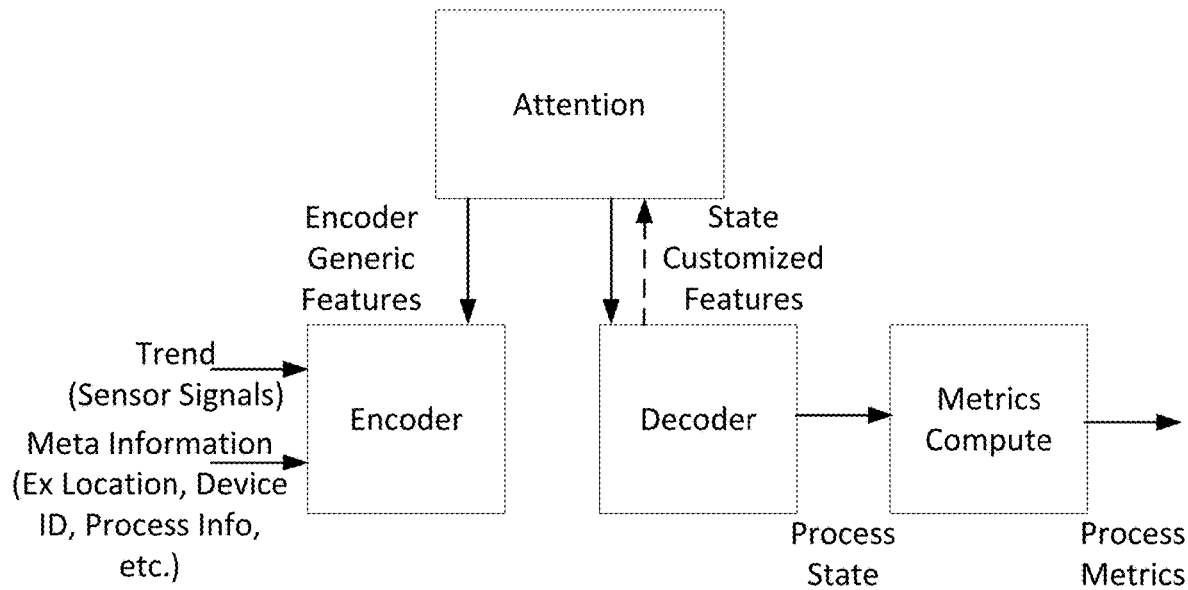
Figure 11:
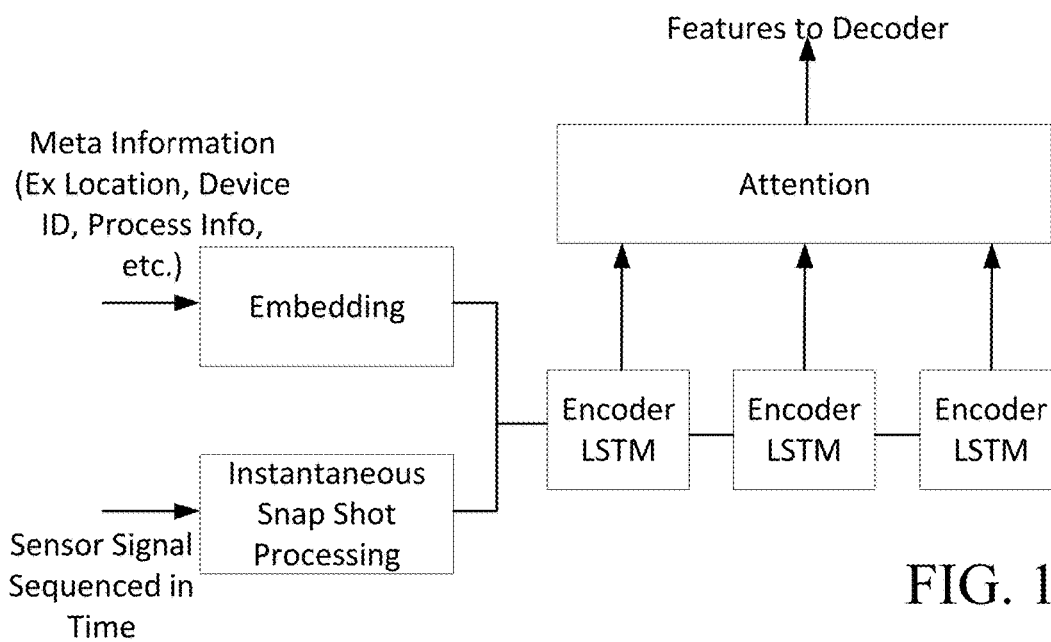
Figure 12:
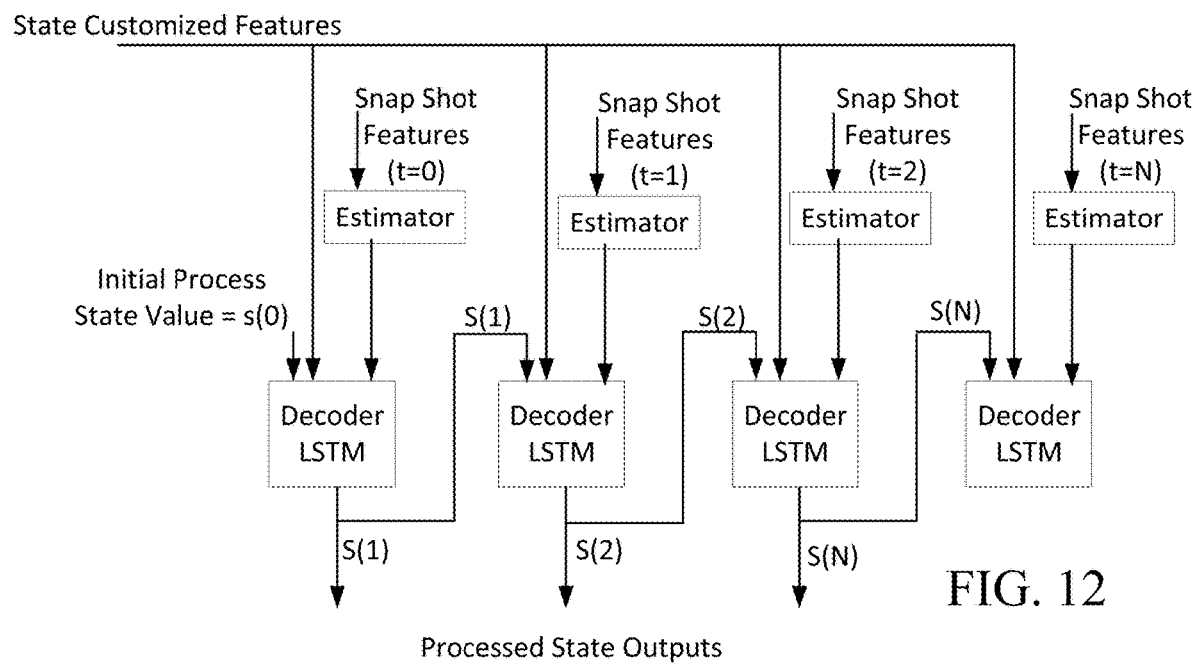

FIGS. 10-12 provides an exemplary sequence based neural net model to compute process metrics according to embodiments described herein.

FIGS. 13-21 illustrate exemplary displays that may be used to visualize according to embodiments described herein.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments described herein include a connected signal source architecture. Processed information from one signal source serves as an input to enable processing of another signal source. Exemplary embodiments may reduce the need to process all the signal sources all the time. For example, in the case of cameras or acoustic sensors, precision is inversely proportional to the field of view covered. Hence, most systems are forced to trade-off between the two and pick a compromise. Exemplary embodiments of the connected sensor system provide the best of both worlds by having a set of sensors address precision requirements while other sensors address field of view/scope (e.g. space, frequency coverage etc.) requirements. Accordingly, exemplary embodiments described herein may comprise multiple cameras. The multiple cameras may be connected through processing algorithms such that an output from one camera may inform an input to another camera, and/or may provide control signals to another camera. Exemplary embodiments include sequential processing, iterative processing, and combinations thereof. Exemplary embodiments may balance the trade-offs and/or permit a user to control the trade-offs between scope and precision.

Exemplary embodiments described herein may be used to provide an automated, continuous monitoring and data capture solution. The system may permit Continuous Improvement (CI), Industrial Engineer (IE), or Field Test Engineer (FTE), or other personnel to focus on a solution rather than data collection and identification. Exemplary embodiments described herein include a camera led implementation with sensors augmenting the capability as and when required. The cameras may be deployed in less density than conventional sensor monitoring and cover greater processes or area of observation. Cameras also permit a universal system application that does not require sensor selection for individual applications. For example, in the case of Internet of Things (IoT) sensors, we may need one type of sensor to monitor pressure changes and another type of sensor to monitor temperature changes. Cameras also permit the separation of the camera from the process or entity being observed so that exemplary embodiments of the system described herein do not interfere with operations. Cameras may also include a longer operation lifecycle than conventional sensors previously used to monitor processes, entities, and systems. Exemplary embodiments also overcome conventional image processing challenges or data processing bandwidth, as exemplary algorithms described herein permit data processing and identification that is accurate, fast, easy to scale, affordable, with reduced data processing computation. Cameras are an example of a signal source described herein. Cameras are not limited to the visual spectrum continuous data capture devices for replay on a display, but may include any large field sensor detector that may take continuous data or sequential periodic data feeds. For example, cameras for detecting different frequency bands may be included within the understanding of camera, including heat detection cameras, night vision cameras, etc. Cameras may also include depth detectors. Other camera ranges in different frequencies may also be included in the scope of the instant application. Exemplary embodiments of camera may include any physical sensor capable of wide area observation or receipt of information. This may include acoustic (sound) sensors.

Exemplary examples of the camera system may include mechanically controlled system. For example, one or more cameras may be on a moveable stage, or may be controlled to adaptively or dynamically change a tilt, direction (pan), and/or zoom of the camera. In an exemplary embodiment, the system according to embodiments described herein include a first camera positioned in a high level location. High level location is understood to include a large scale view of an area or part of the process under observation. One or more second cameras may be positioned at a low level location. The low level location may permit closer perspective with greater detail of a subarea or object of observation. The low level location may be a portion or subset within the high level location or may be a different location outside of the high level location. The low level location may be observed with a camera and/or with one or more other sensors. In an exemplary embodiment, the high level location and low level location may be observed with the same camera. For example, the tilt, pan, and/or zoom may be used to transition from the high level location to and from the low level location. Exemplary embodiments may therefore include adaptive systems in which an output from one or more component or part of the system may be used as an input to another part of the system. The input may be used to control portions of the system.

Alternatively, or in addition thereto, the system may be configured as a static system with cameras configured simultaneously and separately for the high level location and the low level location. Exemplary embodiments may therefore include multiple cameras (or sensors) that can combine the scope and precision with and without adaptive pan, tilt, and zoom. The system may control either automatically and/or manually to transition between the high level location and low level location based on the inputs to the system and the analysis currently being performed.

Although exemplary embodiments described herein are in terms of cameras, the invention is no so limited. Additional sensors and/or monitoring devices may also be used in conjunction with cameras. For example, in critical areas or in any area of interest or as desired based on the process, equipment in use, or any other reason, additional sensors may be included and monitored and analyzed according to embodiments described herein. IoT sensors or IoT like sensors (e.g. Barcode scans, Human based button presses, etc.) may be used in conjunction with cameras to provide additional visibility in key critical areas of the process for monitoring.

Exemplary embodiments may permit visualization to optimize and determine an effective process for application to a business process. Exemplary embodiments include visualization of a workflow, such as through a graph. The system may be used to identify branch joint points in the graph. The system may prioritize branch joints based on branch level depth (measured from the end of the process), user input (process manager or other system user), initial experiments, and combinations thereof. The system may then track relative measure of throughput/inefficiency of one branch relative to another using exemplary tools, methods, and analysis described herein. The system may identify root causes of inefficiency using methods described herein, such as through automated and/or manual tagging. The system may make improvements to the efficiency of the process based on root causes identified for an identified bottleneck branch (i.e. in which one side of the branch is latent compared to another side of the branch). Exemplary embodiments may remove or reallocate wasted resources on a latent side of the bottleneck branch. Exemplary embodiments may then move up the process path to find a next critical branch or in the same branch in the workflow and iterate the process. Although an iterative process is shown and described, the entirety of the process can be observed and inefficiencies or reallocations observed and managed simultaneously.

Exemplary embodiments therefore may provide a lean technology approach by limiting what is monitored, or by not monitoring an entire process, or by focusing the analysis and assessment at strategic locations of the process. Exemplary embodiments may start with constraint branches and constraint workstations and then iteratively optimize both within the same broach and/or across branches. Exemplary embodiments may optimize workflows using the branches. Exemplary embodiments may also or alternatively be used to monitor desired or selective branches without first identifying a specific bottleneck. Performance at any given branch or process location, step, or point may therefore benefit from embodiments described herein. Exemplary embodiments may also be used to monitor an entire process and optimize an entire process in unison.

Exemplary embodiments may provide visual indications of activities or branches that are under producing verses over producing. Such visualization and assessment of activities may be in real time and dynamic such that embodiments described herein can provide feedback to personnel and can redirect activities in real time in response to a dynamic situation. For example, visual cues may be provided on the process floor such that workers may receive the cue (for example, using automated Andon lights) and realign priorities in order to improve overall efficiencies of the process. Benefits of resource reallocation may therefore be achieved without additional supervision. Exemplary embodiments may therefore be used for dynamic workflow optimization and/or line balancing.

Figure 1A:
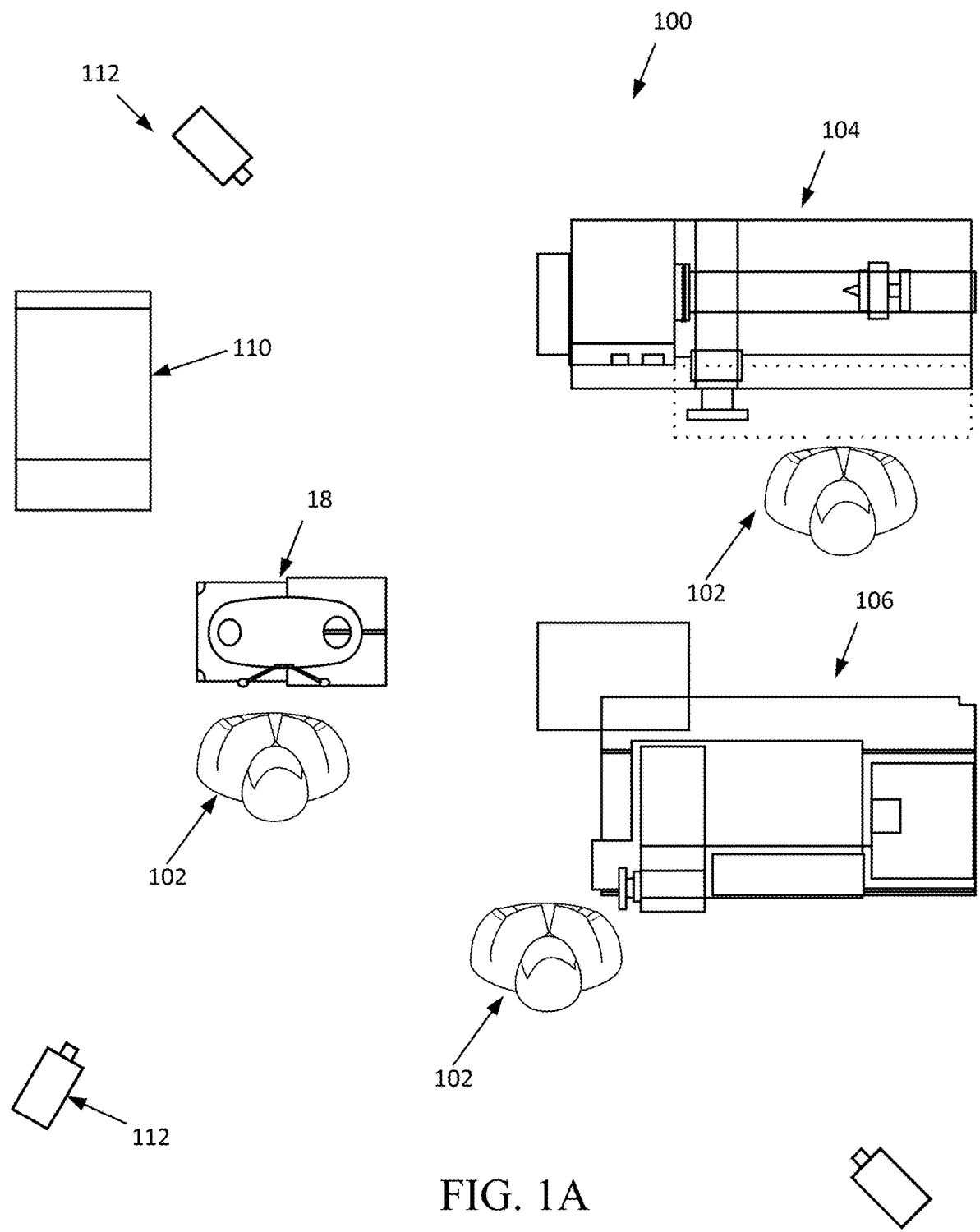
FIG. 1A illustrates an exemplary process floor that may benefit from embodiments described herein.

FIG. 1A illustrates an exemplary process floor 100 with a plurality of workers 102 running a plurality of machines 104, 106, 108. An exemplary process may be in a creation of a component that is taken from different work stations to be machined at the different machines. An exemplary process may be in a creation of a component that is formed from different parts that are created from different machined processes. The process path may include a different combination of parts, machines, and personnel coming together to perform individual steps to complete the process. Each of the intersections of part(s), machine(s), and/or personnel may create a branch in the process. At each branch, there is a potential for one input of the branch to be more inefficient than another input such that one side becomes latent as compared against another. For example, each of machines 104, 106, and 108 may have its own personnel and have separate parts running simultaneously. However, the part at the first machine 104 may be ready before the next machine is finished with its part, such that the part leaving the first machine 104 becomes latent as it waits for access to the second machine 106. Latencies may also arise if supplies must be retrieved, such as from a supply cabinet 110, while a machine 108 remains unused. Latencies may also arise when different component parts come together and one part is ready before another before the two or more parts can be assembled. A process path will have many source of root causes to an inefficiency from machine up/down time, personnel delays, supply chain, etc. The root causes may be systemic, such that the root cause is from the design of the process path. For example, the machine process at a first machine may simply take less time than a process time at a later machine. The root causes may also be non-systemic in that they arise based on unplanned activity. For example, a machine may break, a worker at a given machine may get distracted or be inefficient. The root cause may be dynamic in that it changes and is variable over time.

Exemplary embodiments may be used to view, show, and/or realize inefficiencies within a process. Exemplary embodiments may analyze a system at a process level including all or a subset of resources. For example, the system may monitor the use of people, machines, tools, parts, etc. The system may be configured to determine that a resource is underutilized such as when a machine is not in use, a person is not at a station or desired work location, a part is backed up or waiting to be processed at the next step, etc.

Conventionally, to detect root causes of a process inefficiency, a person or persons would observe the process for a period of time. The observation is generally based on one or more presumptions about the root cause as any number of people cannot observe and comprehend the entirety of the process to determine a root cause without first focusing on a subset of likely candidates. Even computer systems observing an entire process path would have to manage a large amount of data in order to analyze and determine a root cause without using a likely subset. Such processing power requires substantial computer power, bandwidth, hardware, and expense.

As seen in FIG. 1A, exemplary embodiments of the system described herein include an automated, continuous monitoring and data capture solution comprising one or more cameras 112. The cameras may define a field of view that captures one or more branches of a process path. For example, a camera may observe one or more machines, personnel, stations, supplies, etc. The system may also include one or more focused cameras on a narrower field of view, such as a process step. The system may also include one or more additional sensors.

Exemplary embodiments described herein may include novel analysis of the signals received from a signal source, such as a camera, in order to reduce the processing requirements on the system, provide real time analysis and/or feedback on the process, and/or identify a root cause of an inefficiency within the process. Exemplary embodiments described herein are directed at determining root causes of inefficiencies in a process path. However, exemplary embodiments are not so limited. For example, exemplary embodiments may also be used for assessing, tracking, and/or recording for quality assurance or safety compliance. Other applications may also include inventory management, supply chain management, and/or personnel assessment.

Although embodiments described herein may be optimized for real time analysis and metrics of performance, exemplary embodiments may also be used to analyze historic data, information over time, etc. Exemplary embodiments may therefore provide real time and non-real time analysis and metrics of process performance. Exemplary embodiments may provide automated, semi-automated, and manual root cause identification. Exemplary embodiments described herein may therefore be used in quality control, safety, inventory management, supply chain, etc.

Figure 1:
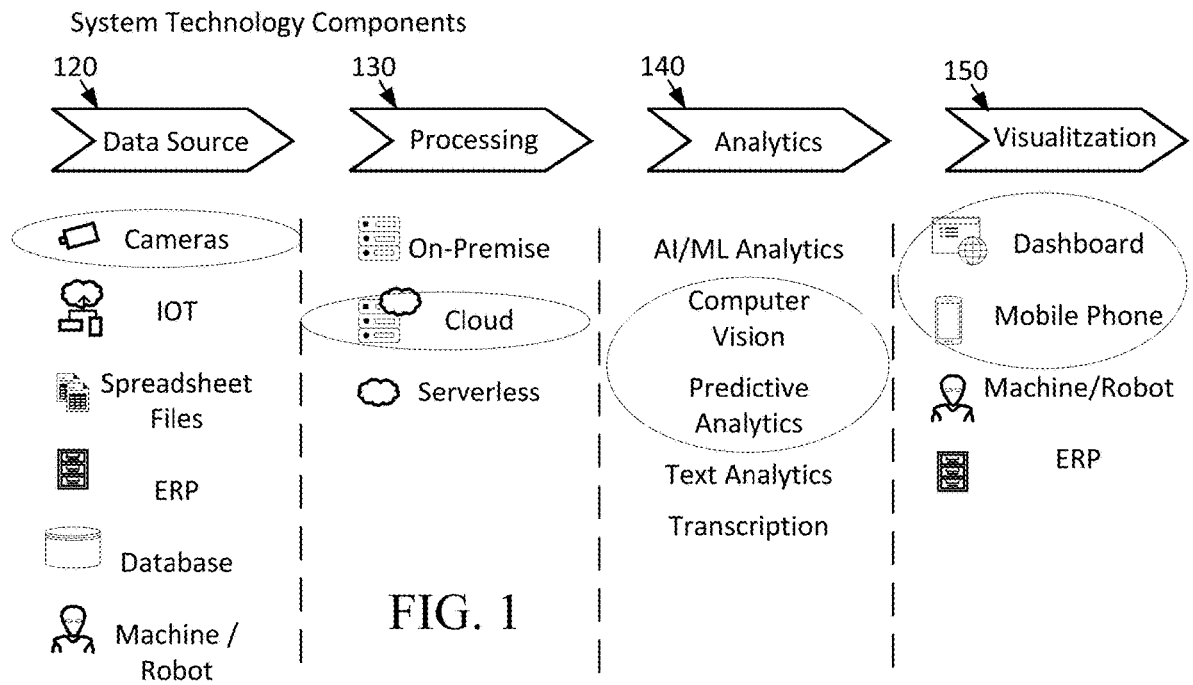
FIG. 1 illustrates the technology components of an exemplary system that may perform the functions described herein, for example, such as components for data sources, processing, analytics, and visualization.

FIG. 1 illustrates the technology components of an exemplary system that may perform the functions described herein including a highly customizable platform for rapid scalability across a business for any application described herein or other application that would be apparent to a person of skill in the art. Any one or more system components may be used in any combination. System components may be duplicated, integrated, added, removed, or otherwise configured to achieve the desired objectives.

As seen in FIG. 1, the system and method may include one or more data sources 120, Processing Blocks 130, analytics 140, and visualization system and methods 150. The data sources 120 provide signal sources for the inputs to the system to consider and provide a representation or result to a user through the visualization 150 or user interface display. The processing 130 and analytics 140 permit the functions described herein (for example, among others, asset effectiveness, issue identification and prioritization, workflow optimization, monitoring, estimation, verification, compliance, presentation, identification) for the applications described herein. Such application may include, but are not limited to, manufacturing, quality control, supply chain management, and safety compliance.

The data sources 120 described herein are exemplary only, and may include any component for generating or receiving one or more data inputs that can be analysed and/or observed over time according to embodiments described herein. For example, exemplary data sources may include cameras, IoT, digital devices, user inputs, software inputs spreadsheet or other information sources, Enterprise Resource Planning (ERP) software, database(s), other electronic or digital system, sensors, detectors, etc.

In an exemplary embodiment, the sensor may include a barcode scanner. The barcode scanner may be integrated into the camera system such that an object with a barcode on it, used to identify an object may be recognized in the system. The barcode scanner may also be a separate sensor. In this case, a component part or other object moving through the process may be identified with a barcode. Users at individual stations or at locations within the facility or along the process may have barcode scanners configured to scan the barcode of an object as it moves through that location. The barcode scanner may be used, for example, as a time stamp of when an object is received and/or leaves a location. For example, a technician may receive a part as part of a larger process and use a barcode scanner to scan a barcode associated with the object when it is received at the technician's location. The technician then performs a function at their station on the object, and scans the barcode again when the object leaves their station. The system may use these time stamps to detect and/or determine events according to embodiments described herein. Other sensors, such as radio frequency identification, sonar, radio frequency, infrared, Near Field Communication (NFC), Bluetooth, etc. may also or alternatively be used to identify, scan, and/or time stamp objects and/or events according to embodiments described herein. Exemplary embodiments may incorporate one or more independent sensor systems, such as a barcode scanning system. Exemplary embodiments may use the one or more sensor systems to provide time stamps of events that is then utilized by the system to analyze the given process and/or provide information for visualizing and/or detecting events according to embodiments described herein.

Exemplary embodiments may be used in combination with the camera and sensor systems described herein. For example, a barcode may be scanned at a first location and the camera system may be used to determine when the component part leaves the station. The barcode (or other sensor) scan may be used as an input to the system to focus a fidelity as described herein for analysis. For example, an input from a sensor, such as a scan of a part may be used to specify portions of a camera frame to focus on and/or analyze and/or to predict the presence or absence of a part for recognition and/or to set a state condition of the system and/or to use high level location and/or low level location settings of the camera configuration (pan, tilt, zoom, and/or a select subset of camera feed combinations for processing).

The processing 130 may be performed on premises, may be through a network or cloud, may be serverless, may be distributed across one or more digital devices within the system, and combinations thereof. For example, some analytics (including pre-processing) may be performed at the data source, while other analytics may be performed at a remote location on a remote processing unit or distributed among one or more processing units. The processing units may be dedicated machines or incorporated into one or more other system components. The system may include one or more processor(s) and memor(y/ies), where the memor(y/ies) include non-transitory machine readable medium that when executed by the one or more processor(s) perform the functions described herein.

The system may include visualization 150 for providing an output to a user in one or more ways. For example, the system may be configured to generate a dashboard for display on a visual display. The dashboard may present information to the user, retrieve or display information from the data sources, identify the results of the analytics including, but not limited to, asset effectiveness, issue identification and prioritization, workflow optimization, monitoring, estimation, verification, compliance, presentation, identification, and simulation of what-if scenarios. The system may output information from the analytics into one or more data sources, such as a database, record, another software program, or management system. The system may provide other outputs to a user, such as visual, audial, or otherwise. For example, when an issue is identified or when resources are not optimized, a notice may be sent through visual or audial cues to reposition resources, as described herein or otherwise understood by a person of skill in the art. Any combination of cues (such as visual cues and/or audio cues) may be used. Exemplary embodiments may include system control features such that machines may be shut down to indicate the movement of personnel from one location to another. Other indicators, such as signs, display screens, lights, etc. may also or additionally be used.

Exemplary system and methods described herein may include configurable algorithms that may combine deep learning, signal processing, and combinations of other machine learning, artificial intelligence, or analysis methodologies. The analytics 140 may include artificial intelligence (AI), machine learning (ML), computer vision, predictive analytics, text analytics, transcription, and combinations thereof. Exemplary embodiments may provide accurate results even under very low image/signal resolution. Exemplary embodiments may be customizable to customer's needs, scalable, and affordable.

Figure 2:
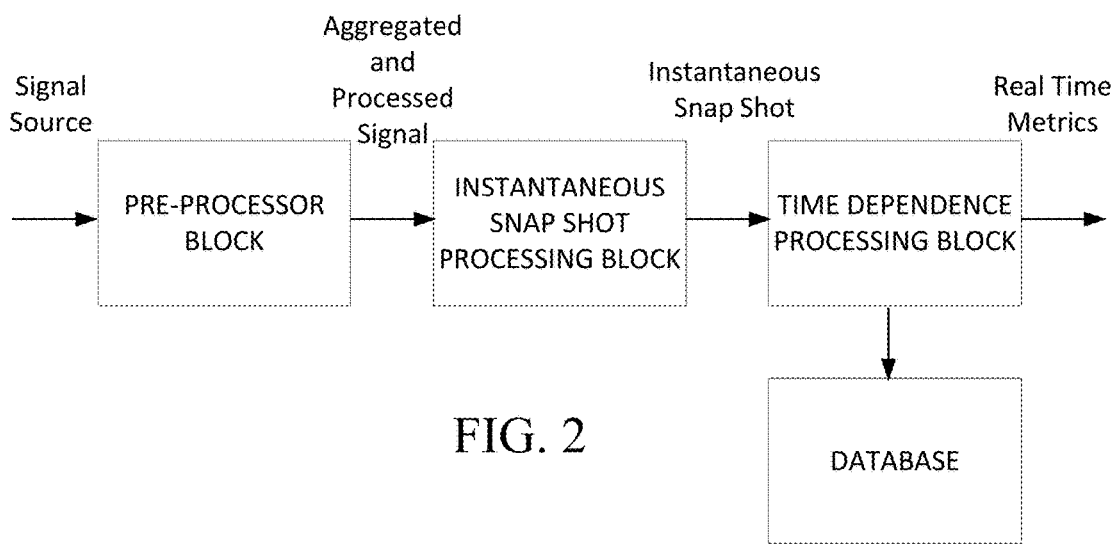
FIG. 2 illustrate exemplary pre-processor and aggregation algorithms and details according to embodiments described herein.
Figure 3:
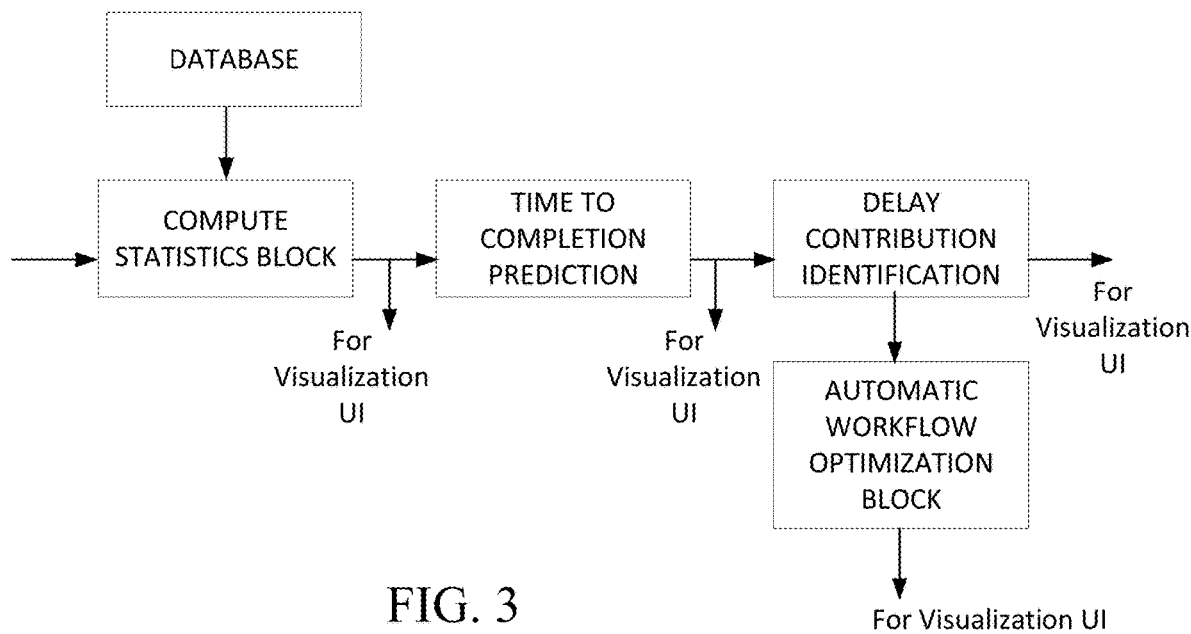
FIG. 3 illustrates the exemplary analytics according to embodiments described herein to generate the features and benefits described herein.

FIG. 2 illustrate exemplary pre-processor and aggregation algorithms and details according to embodiments described herein. FIGS. 4-7C illustrate exemplary processes describing the pre-processor and aggregation algorithms described in FIG. 2. FIG. 3 illustrates the exemplary analytics according to embodiments described herein to generate the features and benefits described herein.

Figure 4:
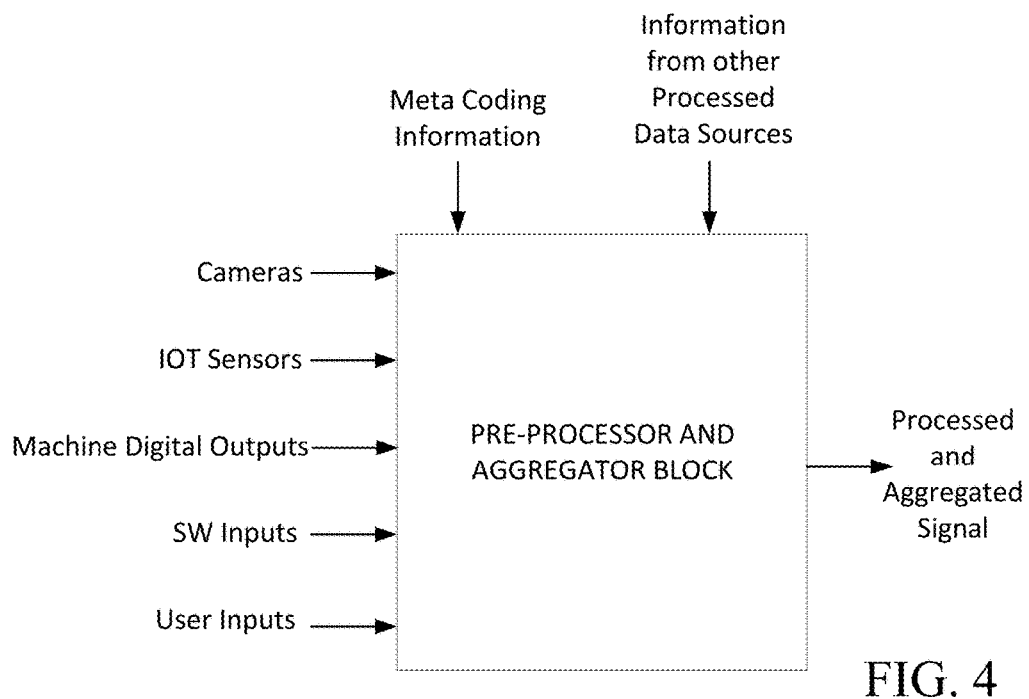
Figure 5:
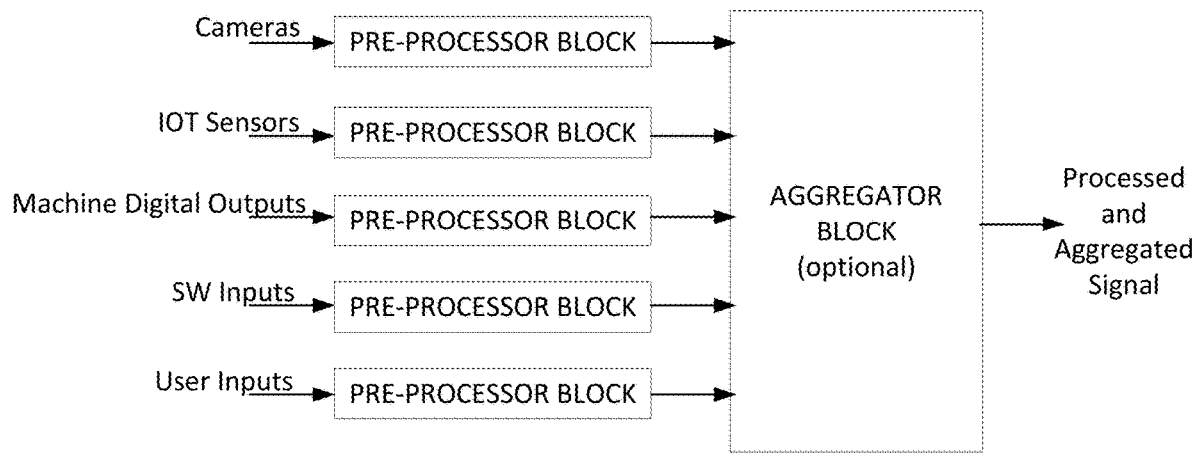
Figure 6:
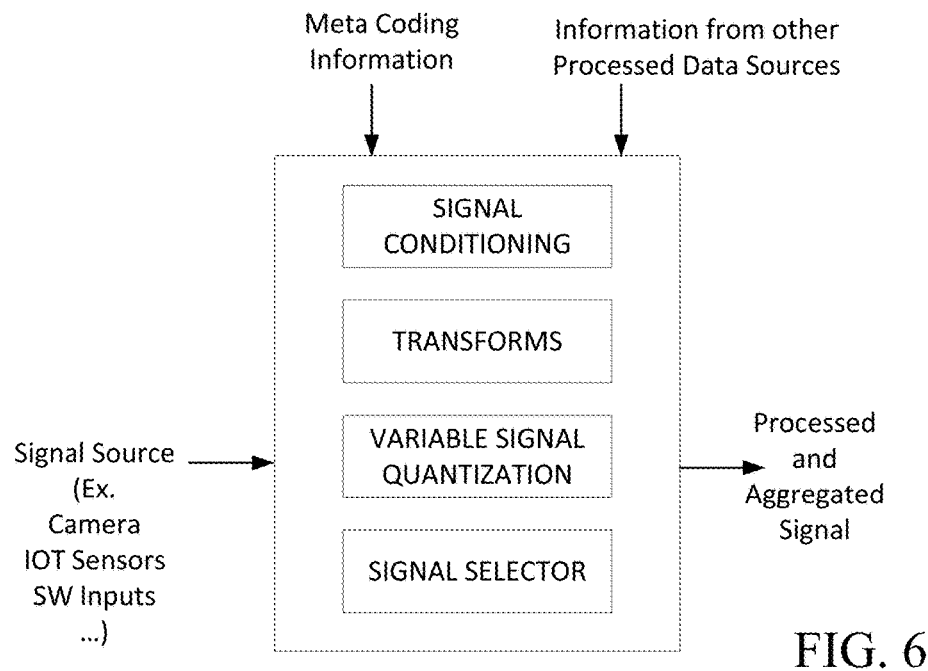
Figure 8:
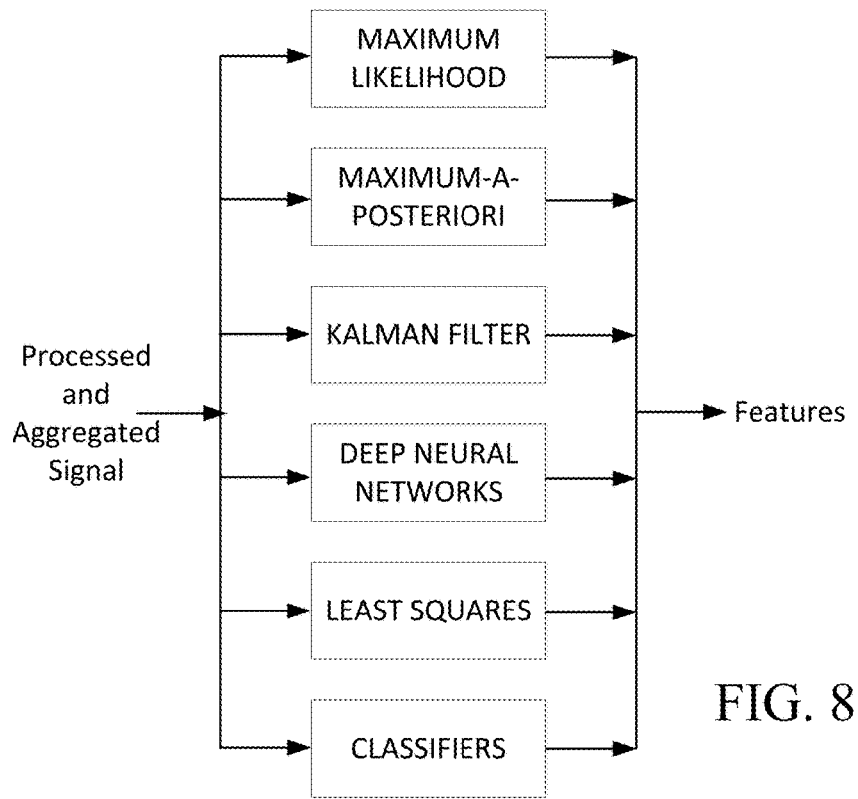
FIG. 8 illustrates an exemplary Process Block of the Instantaneous Snap Shot Processing Estimator Block of FIG. 2.
Figure 9:
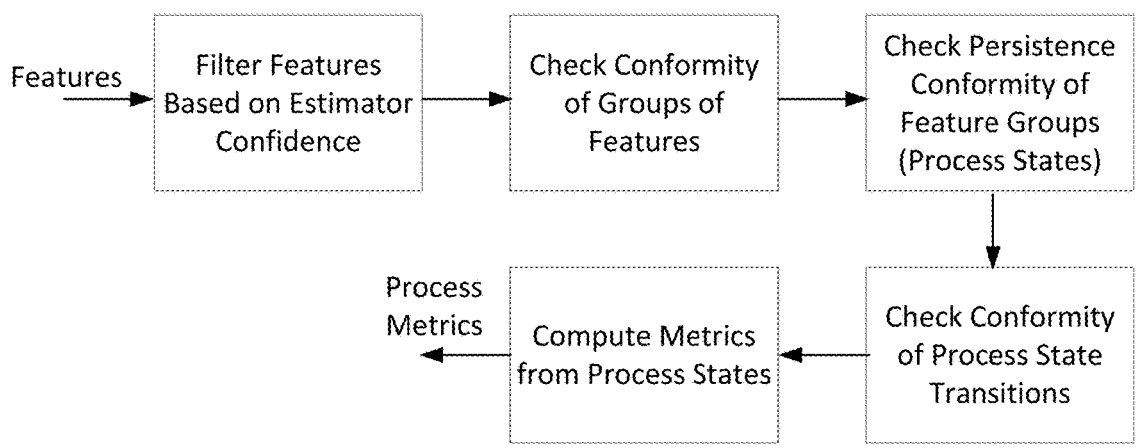
FIG. 9 illustrates an exemplary Process Block of the State Based Time-Dependence Processing Block of FIG. 2.

FIG. 2 illustrates an exemplary pre-processing and aggregation according to embodiments described herein. The pre-processing and aggregation algorithms may receive signals from a data source, pre-process the received signals, aggregate the processed signals, process the aggregated pre-processed signals with an instantaneous snap shot processing algorithm to generate an instantaneous snap shot that may then be processed for time or any causal dependence for a real time metric for observation and analysis. The pre-processed snap shot may originate from one or more signals from various sources (data sources) (either individually or in combination/aggregation). The Pre-Processor Block may be used to adaptively vary fidelity, processing size, identify areas or portions of signals for observation and analysis, remove areas or portions of signals not of observation, sampling, filtering, etc. FIG. 4 illustrates exemplary Process Block of the Pre-Processing Block of FIG. 2. FIGS. 5-6 illustrates exemplary Process Blocks of the pre-processing and aggregation. FIGS. 7A-7C illustrate exemplary options of aggregated and processed data signals from camera images. The aggregated and processed signals may be input into an Instantaneous Snap Shot Processing Block that estimates various features or state attributes. The features or state attributes can be, for example, object position (in the case of images) or signatures in signal waveforms associated with IoT sensors. These features may be generated using many Processing Blocks like Deep Neural Nets (DNN) (for example Region based Convolution Neural Nets—RCNN), Transforms (DCT, FFT, etc.) or adaptive signal processing algorithms like Kalman estimators. FIG. 8 illustrates an exemplary Process Block of the Instantaneous Snap shot Processing Estimator Block of FIG. 2. The features and attributes generated by the Instantaneous Processing Block (i.e. Instantaneous Snap Shot of FIG. 2) are then input to the State Based Time-Dependence Processing Block. The State Based Time-Dependent Processing Block may be programmed to measure and track any combination of the following: conformity of features to specific values/value ranges (e.g. location of an object or a group of objects within a certain region of the image, signal features like derivatives within certain bounds); conformity of persistence of such features indicating a certain process state; conformity of specific transition of such persistent process states from one to the other; metrics related to such transitions like duration between specific transitions and number of transitions. Additionally, in another embodiment, these features and attributes from the Instantaneous Processing Block are then fed into Sequence Modelling Algorithm Blocks. This may be performed using Long Short Term Memory (LSTM), Gated Recurrent Unit (GRU), etc.(. FIG. 9 illustrates an exemplary Process Block of the State Based Time-Dependence Processing Block of FIG. 2.

Exemplary embodiments may include processing various signal sources. The signal sources may be aggregated during or before processing. The processing may include adaptive filtering and/or noise reduction. The processing may include adaptive fidelity changes. The processing may include adaptive regional focus based on results from across a plurality of cameras and/or across frames of the same camera, across regions of the same frame, or a combination thereof. The processing may include state based analysis, and/or state transitions to focus the analysis of the data streams.

FIG. 10 provides an exemplary sequence based neural net model to compute process metrics according to embodiments described herein. The neural net model to compute process metrics may be used in place of the block diagram of FIG. 2 or in combination therewith. Time sequenced signals from various sources may be fed as input to an Encoder Block (optionally) along with meta information like location of the sensor, process being monitored etc. to the model. The encoder processes the features across a certain time range and generates decoder state independent generic features. The attention module uses the information from the generic features from the encoder and the historical-state information from the decoder to generate a customized state feature information to be used by the decoder for predicting future decoder states. The decoder may iteratively compute the process states based on previously decoded states and the customized features from the Attention model. The Metrics Compute Block computes process metrics from the process states.

As illustrated in FIG. 11, time sequence of signals from various sources may be fed as input to the Instantaneous Snap Shot Processing Block which generates snap shot specific features for each time instance. Meta information like location of the sensor, process being monitored, etc. may first be embedded into higher dimensional vectors and then fed to an encoder. The data is then aggregated and fed to a family of Recurrent Neural Network (RNN) like LSTM, GRUs, etc. The LSTM may spread the processing of the snap shots for each time stamp and then generate an effective vector. The effective vector may then be combined with information from historical decoder states to generate a customized set of features that help with the decoding of further states as part of the decoder computations.

As seen in FIG. 12, for each process state instance, a State Customized Features along with previous decoder state may be fed into a decoder LSTM block unit, which in turn may generate future process states. Optionally each decoder unit estimation of next state can also be augmented with instantaneous snap shot information corresponding to that time instance, including any meta information. At any given instance, the computed process states may then be fed back to the Attention Block that uses this state information and generates customized features for the next decoder state computation. The computed process states may then be input to the Compute Metric Block to generate the Process Metrics. These process metrics may also be sent to the Visualization and Notification modules for display. Additionally, Process Metrics are also fed to the data base block for storage.

FIG. 3 illustrates the exemplary analytics according to embodiments described herein to generate the features and benefits described herein. The computed Process Metrics and other meta information may be captured in a data base for the purpose of displaying and analyzing trends, compute statistics etc. The compute statics block may be used to measure and compute desired statistical trends or other metrics. For example, data from the database may be extracted to measure statistical trends and other metrics like probability density functions of time to completion of a specific activity, percentage of time a resource (e.g. worker) spends at a working location, heat maps of movement resources, etc. Given the individual's activity's time to completion statistics, the Time to Completion Prediction Block calculates the time to complete an entire work flow consisting of many individual activities. The Delay Contribution Identification Block may compute the delay cost contributions for each block in the entire workflow. The final delay cost computations at the end of the workflow may be propagated for each block upstream in the workflow depending on the contribution to that block to the downstream delay. Based on the cost contribution from each block, the Automated Workflow Optimization Block may rearrange the priorities of resources so as to minimize the total delay cost contribution to the workflow.

Exemplary embodiments described herein may provide metrics for a user. For example, time to completion for a workstation and/or an entire process or line may be provided. As an example, the delay contributions of a block may be provided. As an example, resource utilization may be provided, such as an in use time or down time of a given machine, person, component part, etc. Exemplary embodiments may provide optimized sequences and/or process steps. Exemplary embodiments may permit a use to redistribute resources and/or add and/or remove resources and run simulations based on history or real time data. For example, if a component part on one line coming into a branch gets backed up and delayed by the capacity or through put limitations of a machine and/or person at that branch point, the system may simulate adding another resource (such as another machine and/or person) and/or may simulate removing one or more resources from the overproducing line and/or moving resources from one portion to another. The system may use historic information about machine and/or personnel throughput for a given activity in order to estimate the effects on the process.

FIGS. 13-16 illustrate exemplary displays that may be used to visualize a workflow optimization.

Figure 13:
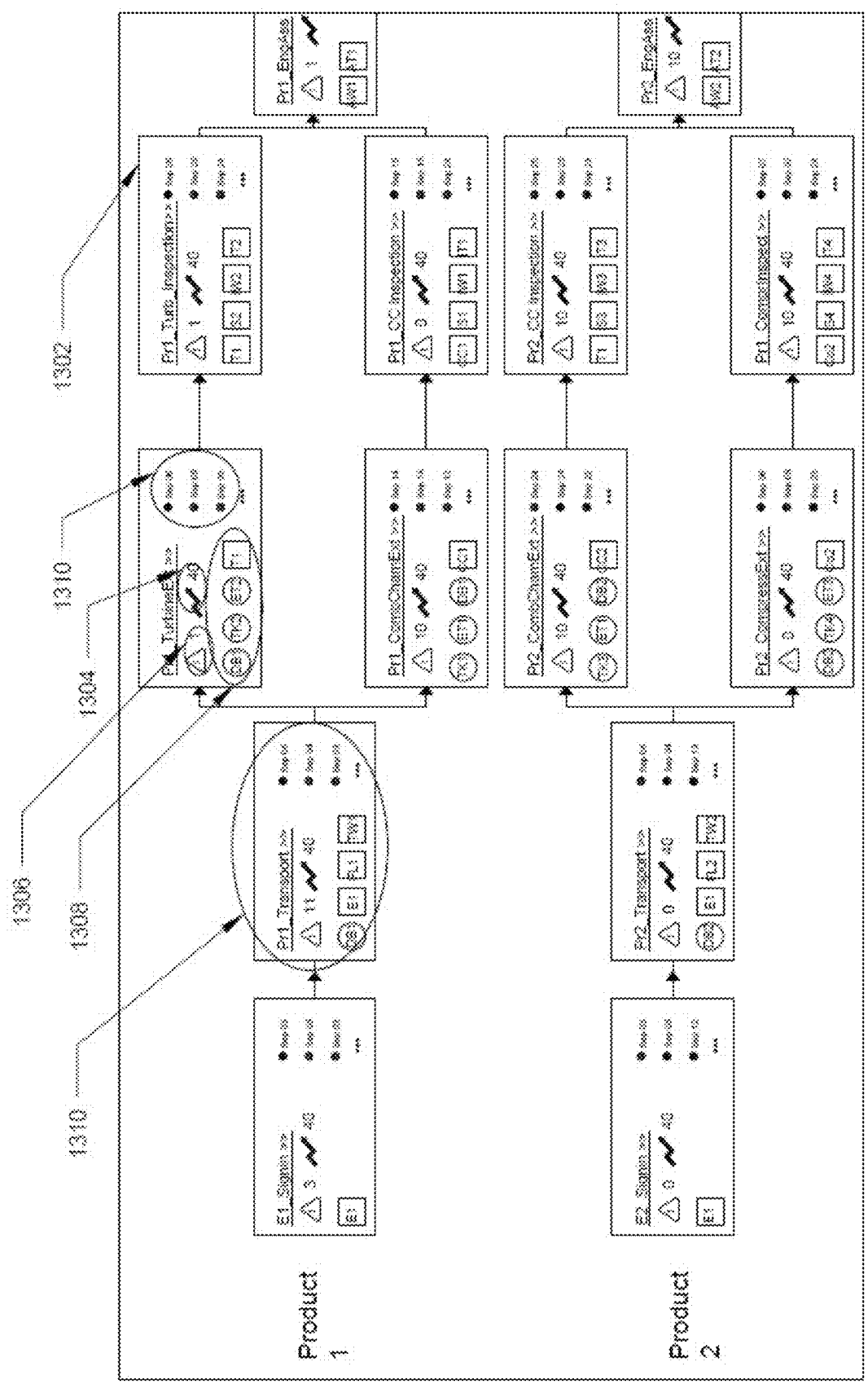

FIG. 13 illustrates the process steps for two products through a production line. Each process step is represented by its own Process Block 1302. FIG. 13 provides a block diagram view of the process flow. A Process Block 1302 may provide information to a user. For example, the resources 1308 used for the process step may be identified. Resources may include personnel, equipment, materials, or other identified metric. The time to completion 1310 may also be estimated and displayed. The probabilistic estimate of the time to complete an activity (e.g. manufacturing job), may be based on historical data. Other information may include progress percentage 1304, delay costs attributed to the process step 1306, or an indication of a process delay or inefficiency 1310, such as through color identification. The process percentage 1304 may measure a process efficiency relative to the process's historical performance of time to completion of activities. The indication of a process delay or inefficiency 1310 may identify the bottleneck resources causing the delay for the given activity. The system may quantify the contribution of each resource to that bottleneck delay. The system may provide visual indication of the activity/activities that are under producing verses over producing. A Process Block may also capture inventory status and may predict time to exhaust stock of a specific type of inventory.

Figure 14:
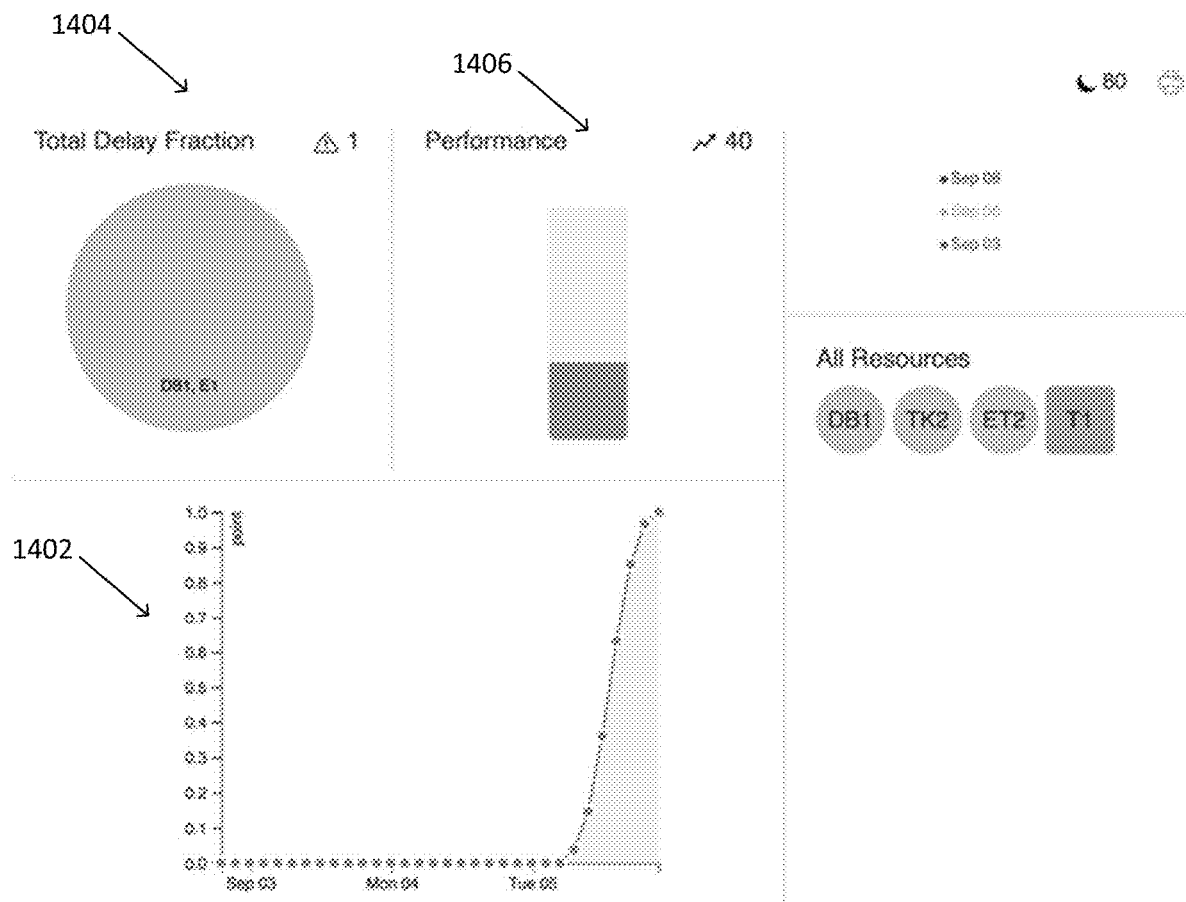

FIG. 14 illustrates metrics for a given process step, which may be displayed if a user selects onto of the process steps from FIG. 13, for example. The probability of activity completion 1402 may be predicted for the process step. The resources or metrics attributing the delay may be displayed as a total delay fraction 1404 and corresponding visualization, such as a pie chart of the root causes contributing to a delay.

Figure 15:
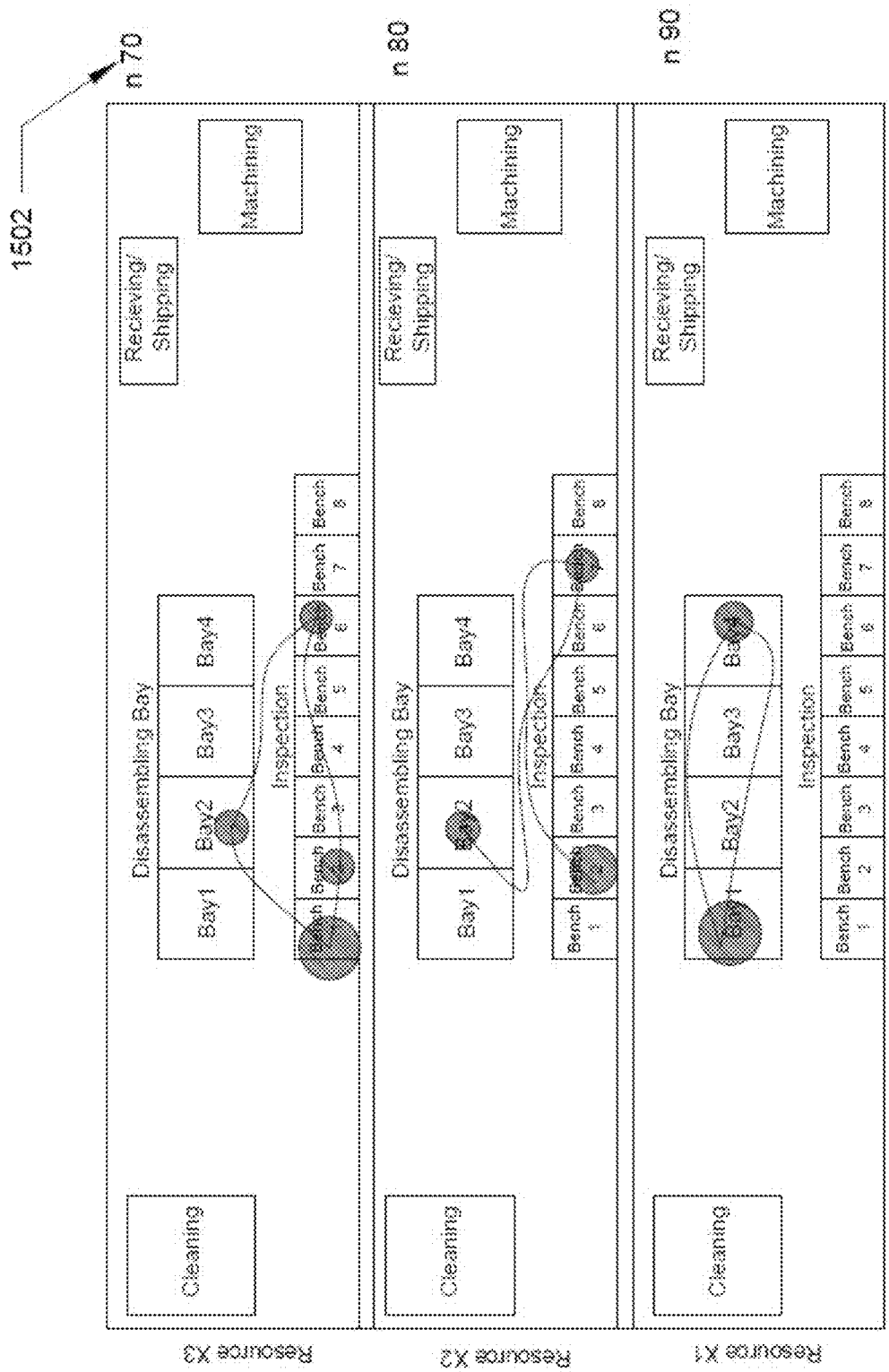

FIG. 15 illustrates an exemplary visualization in which resources are identified in a heat map indicating their location during the processing steps. The heat map may be for tracking a component part, personnel, or other resource through the process steps. The heat map may provide visualization of resource allocation, delays, etc. As illustrated in FIG. 15. An efficiency 1502 of a given resource can be calculated and displayed. The measure of efficiency for each resource may be based on the time spent on/in the required zones.

Figure 16:
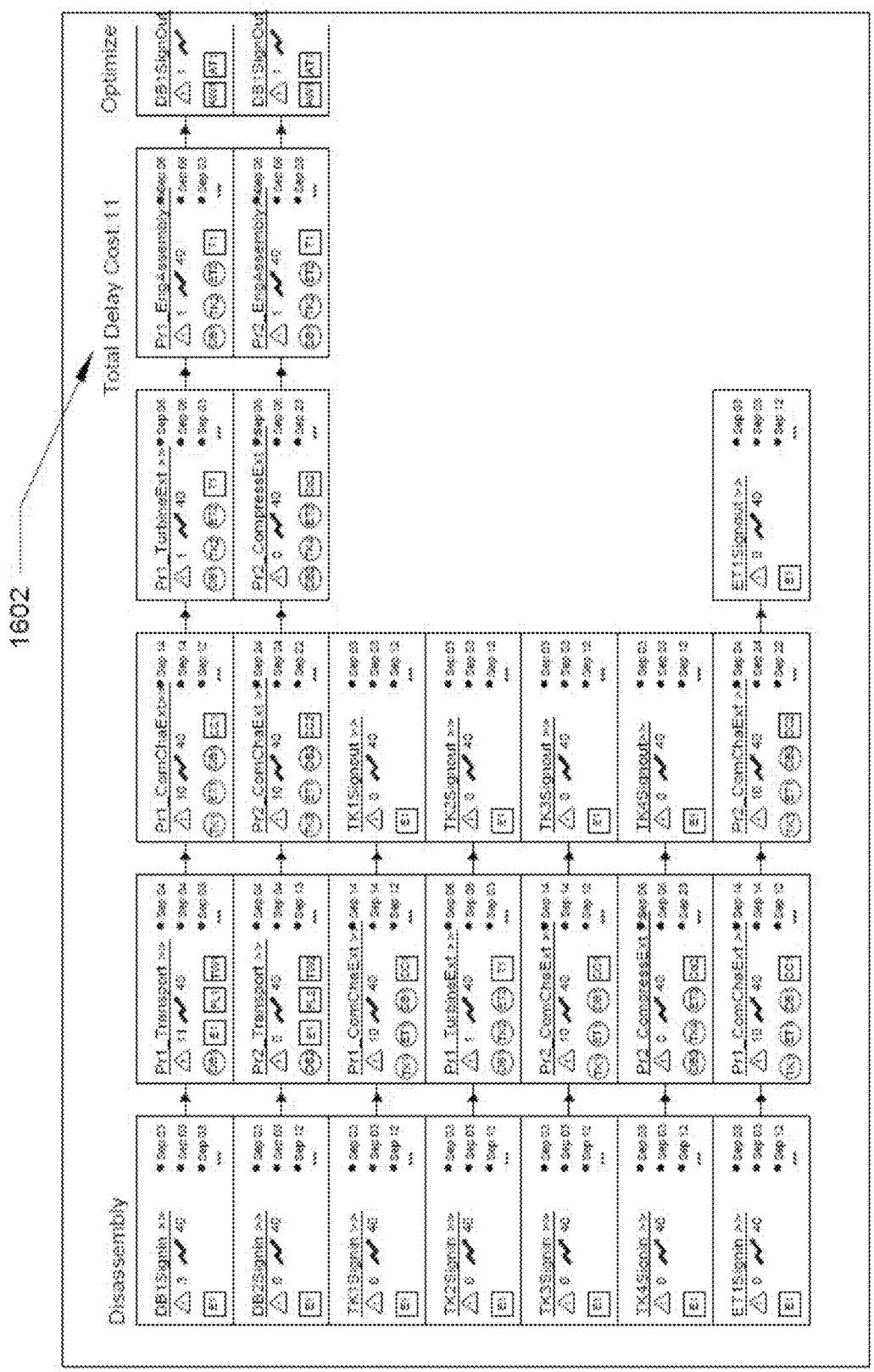

FIG. 16 provides an exemplary department specific visualization. As illustrated, the system may also provide a feature to optimize the sequence of activities (e.g. manufacturing jobs), in addition to the priorities of resources, based on bottleneck contributions. The sequencing and prioritization may be changed adaptively based on inputs and updates from various data sources. The department specific view or group specific view of optimized workflow provides a visualization of various resources involved in the department.

Figure 17:
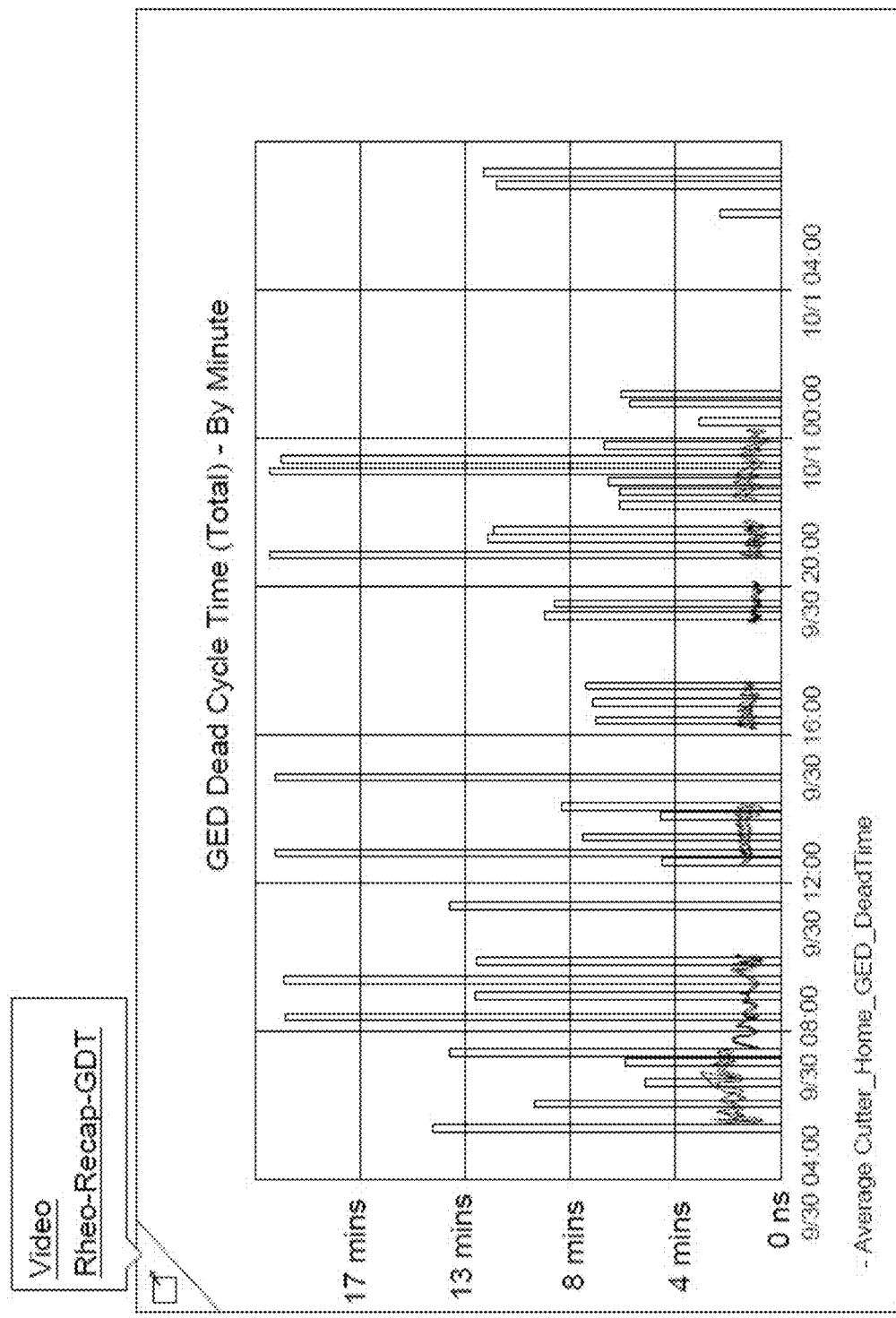

Exemplary embodiments may be used to simulate the effects of changes to workflow (including user defined ones). Some examples of changes may include simulating the effect of reduction in root causes of inefficiencies identified using the methods described above FIGS. 17-21 illustrate exemplary visualizations for recap review by a manager or other user. Exemplary embodiments of a visualization system includes a dashboard with various representations of individual or aggregated metrics. For example, as illustrated in FIG. 17, one or more metrics may be provided and plotted over time. The dashboard may be configured to permit a user to zoom in to a specific section of the plot. The user may be able to view the data from the data source corresponding to the represented metric. For example, the data source may be from a video recording from a camera. The user may select a specific time and see the video footage associated with the camera feed at that time. Exemplary embodiments may include dashboard zoom features to lead and/or permit a user to navigate through videos in desired durations or time scopes. Exemplary embodiments may include augmented dashboards with video feeds.

Figure 18A:
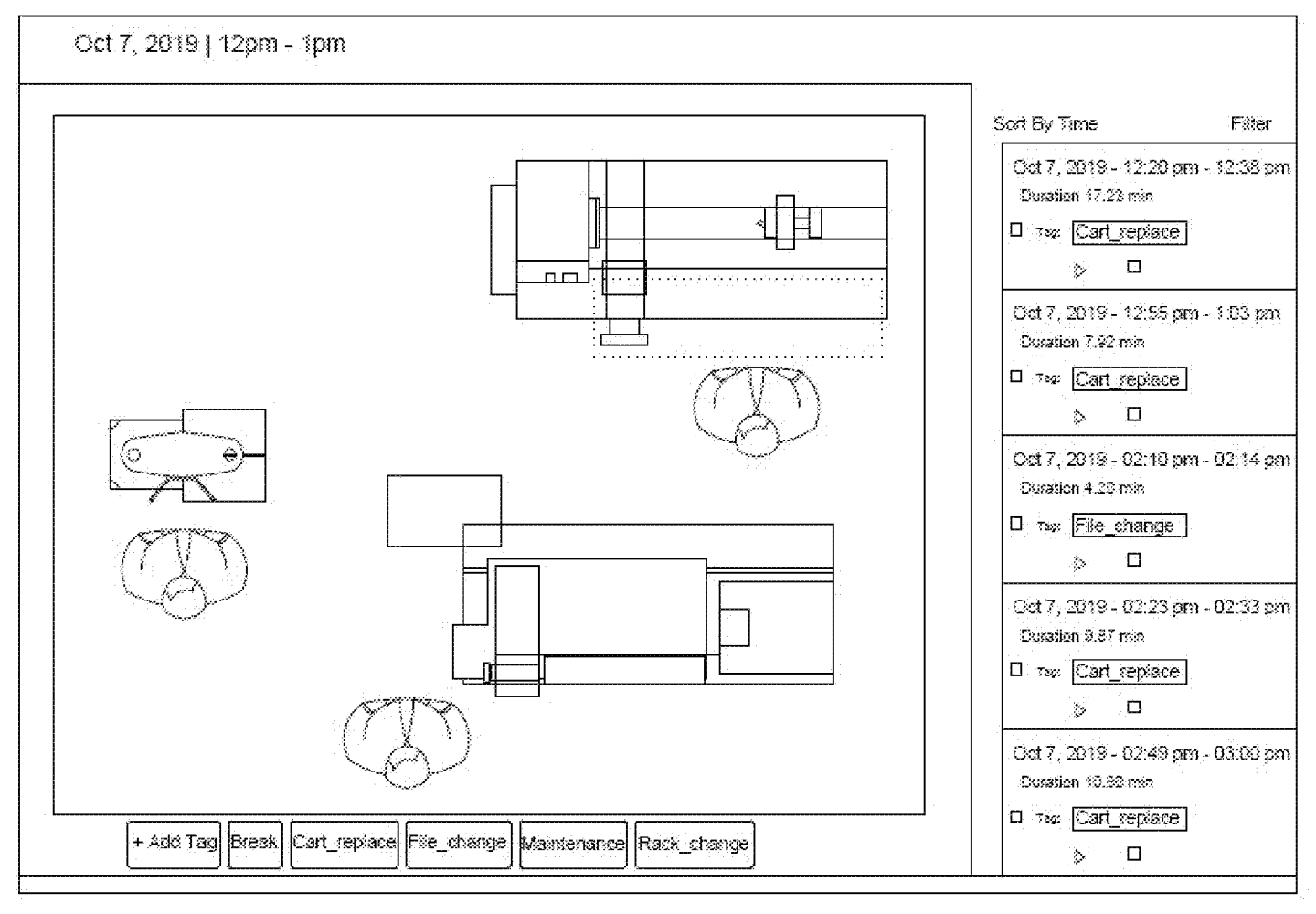
Figure 18B:
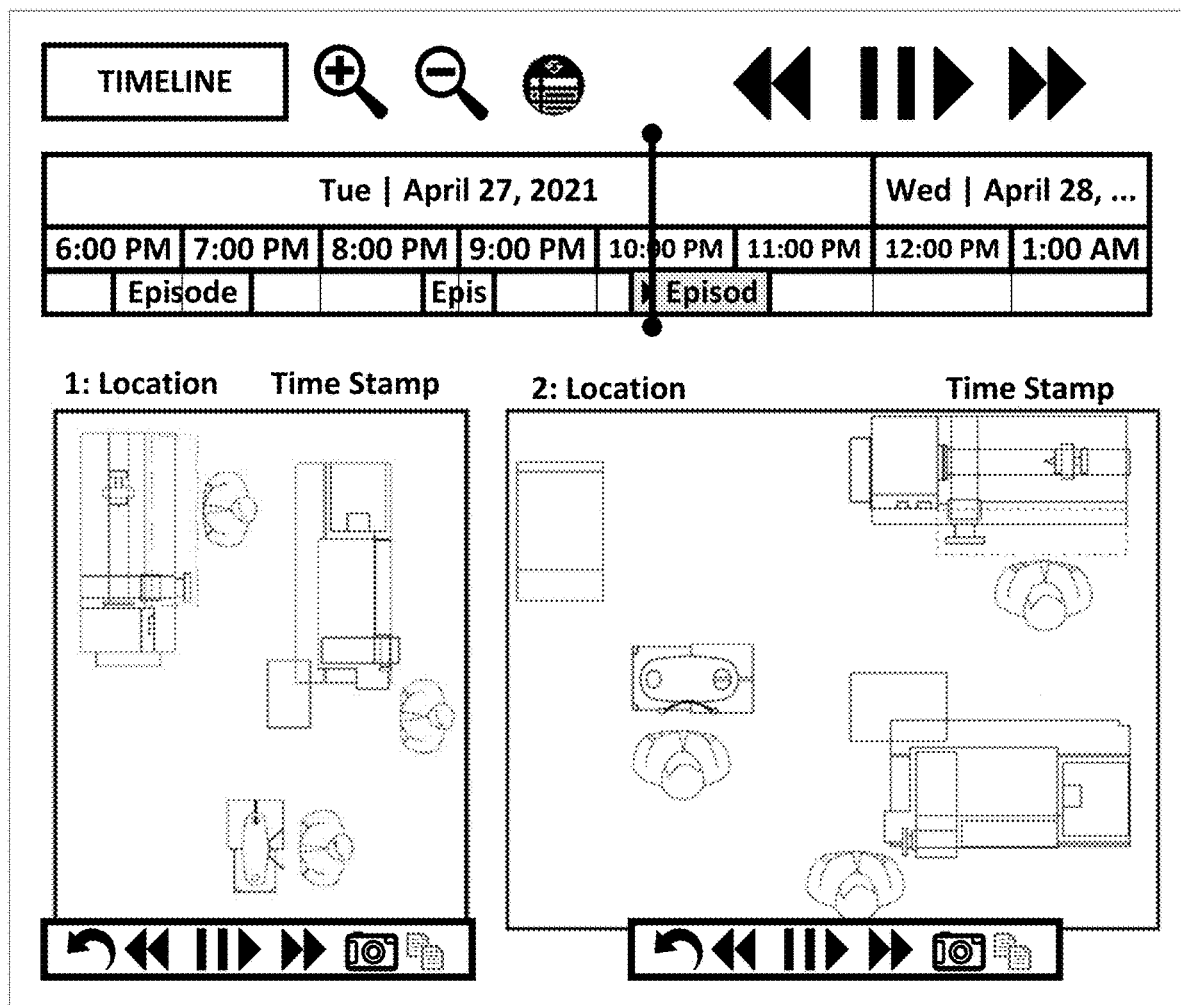

As illustrated in FIGS. 18A-18B, exemplary embodiments may automatically identify epochs of critical events or any event in the process (such as those identified with a metric above or below a threshold, or when processing time exceeds a threshold). FIG. 18A uses the image of FIG. 1 to illustrate a camera feed of an area for sake of illustration. An actual camera feed may show the perspective view of a process area in a specific band or detection method (such as audio, visible light, temperature, etc.). As illustrated, the camera feed is provided on the left of the image, and a list of critical events are identified sequentially on the right of the image. A user may play the events sequentially or may click through on given events to see the corresponding video images associated with the events. The user may also use the interface to tag or classify the actions that are occurring in the given event. For example, as described herein a cause of the critical event may be identified by the user. These tags may be used to search for specific events and/or may be used to train the system to automatically identify other events. FIG. 18B illustrates an exemplary embodiment in which the epochs of critical events are illustrated on a timeline. As shown, a timeline is provided at a top portion of the screen. The occurrence of an event (identified as "Episode" in the illustration) are provided as icons on the timeline. A user may then click on any event (or any portion of the timeline) and initiate one or more videos associated with the selected time. As illustrated, two cameras are selected that correspond to images that contributed to a given "episode". The system may automatically select one or more camera feeds that may identify or assist the viewer in identifying or understanding the cause of one or more episode. The user may also select one or more cameras to display and/or add or remove one or more cameras from the display for the selected time. As illustrated, the individual camera feeds may also be manipulated, such that a user may play, pause, forward, or rewind one or more of the given data streams. Although illustrated as camera feeds, the user interface is exemplary only and may incorporate any data stream captured by the system, such as sensor information, audio, visual, or other data. Exemplary embodiments may also include combinations of the timeline and lists of epochs as described and shown by FIGS. 18A and 18B.

Exemplary embodiments may include any combination of timelines and video(s) overlays. Exemplary embodiments may include automated camera context switching. Exemplary embodiments may include combination of information displays that may include camera feeds and/or other information/data types, such as from sensors, user inputs, tags, files, or other sources.

Figure 18C:
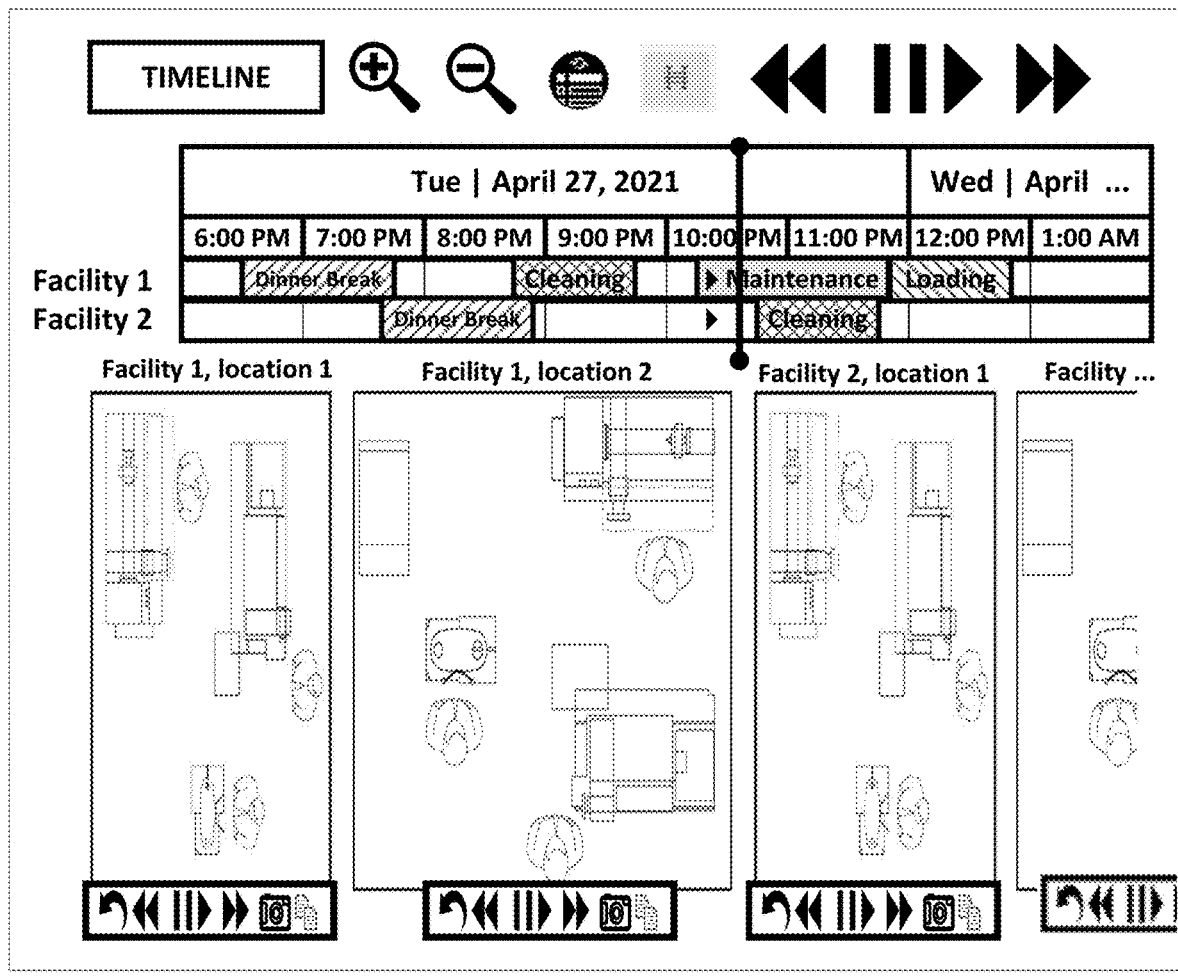

FIG. 18C illustrates an exemplary embodiment in which the visual display can be used to compare different lines at different locations. Such comparison can be used to determine relative efficiencies between plants, compare causes of events, etc. As illustrated, a similar timeline presentation is disclosed but includes two lines within the timeline presentation. The two lines may be lines within the same facility or may be lines in different facilities. The different events, identified as episodes, may then be displayed and compared. As illustrated, the cameras feeds associated with the second timeline may also be provided on the screen to directly compare camera feeds from the two timelines associated with one or more given events. The user may also select one or more camera feeds (or other received data stream) in order to review desired locations or information within the one or more locations, facilities, and/or lines. For example, the system may select one or more data sources to display that is related to a given episode as it is encountered on the timeline. The system may permit the user to provide input into the system to identify one or more data sources in which to display. In an exemplary embodiment, the timelines may be tied together such that the associated times between the lines in comparison will play simultaneously. The timelines may be tied together by events, such that a selection of an episode type on one timeline may provide a corresponding similar episode on the other timeline. The time lines may be independent and permit viewing of the respective timelines independently of each other.

Exemplary embodiments may also be used for side by side observation of two or more processes and/or parts of a process. The two or more timelines and/or views may be linked and/or may be fully independent. A user may therefore select different data sources and/or different time segments in which to view portions of the same process and/or different processes. The system may therefore be used to visualize different combinations for comparison and/or observation, such as, for example, viewing the same action or station between different shifts, the same action along different portions of process or performed simultaneously by different resources or at different site locations, the incoming streams to a branch, or simply different portions of interest to the user, and any combination thereof. Once selected, the selected timelines and/or data source visualizations may be linked so that they run together in time (such as taking a single command to start and stop the visual displays) and/or may be separated and independently controlled such that a user may view different portions of the visual displays at the desire and input command of the user.

In an exemplary embodiment, the indication of one or more events, identified as episodes in FIGS. 18A-18C may include additional information according to embodiments described herein. For example, the identified episodes may include a tag or identifier of a source or root cause of the event that is flagged. The identified episode may be color coded or include a text description to identify information about the episode. FIG. 18C illustrates an example in which the source is identified on the episode icon, as well as the icon being visually identified (which could be color, but is provided in distinct patterns for illustration purposes).

Figure 18D:
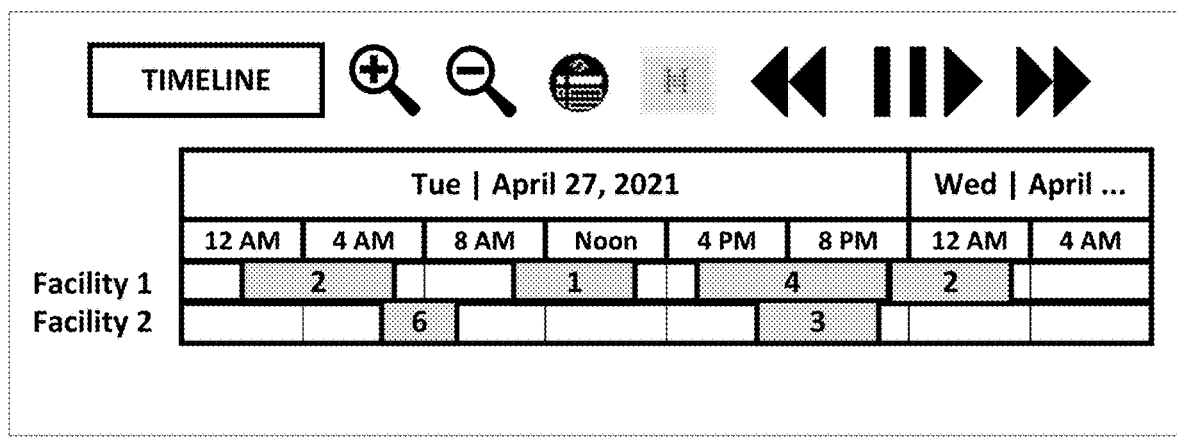

As illustrated, the timelines may include a user input for the user to zoom in and/or out of the timeline. Zooming in on the timeline may permit the timeline to expand such that a total illustrated time duration is reduced. Such expansion of the time line may permit more detail into the episodes of the timeline. For example, when a timeline is zoomed in, the root causes may be identified within a given episode. Zooming out on the timeline may permit a larger time duration to be shown within the represented timeline. The icons of the episodes may be reduced, and may include less information of the respective events. FIG. 18D illustrates an exemplary embodiment in which the timeline is zoomed out. If the timeline is expanded to include multiple days or sufficiently large durations of time, the episodes may be consolidated into blocks and a total number of episodes occurring within a given duration that is a subunit of the displayed timeline duration is provided to the user. The user may then select that episode indicator and expand the timeline to encompass the episodes indicated in the given subunit. The zooming feature permits a user to obtain a high level understanding of a performance of a line over different time durations, which easily navigating to different levels of granularity to assess, review, and understand root causes of events and/or improve and/or compare efficiencies of a given process. In an exemplary embodiment, when a timeline is zoomed out, the timeline may identify an icon or a block representing the total time lost for one or more events or episodes within the time duration, and/or the number of events/episodes that contributed to the total time lost. This permits a user to review one or more lines, locations, etc. at a higher level to then focus on the events that have the most impact on the overall performance (either in the number of events and/or in the total time lost or affecting the performance of the line). Exemplary embodiments of the zoom in and out feature may be to provide an expanded or condensed timeline and/or to provide aggregated displays of information. Exemplary embodiments may provide aggregation of statistics about the occurrences (such as tags, episodes, events, root causes, etc.) within a timeline as the timeline is zoomed in and/or out.

Figure 19:
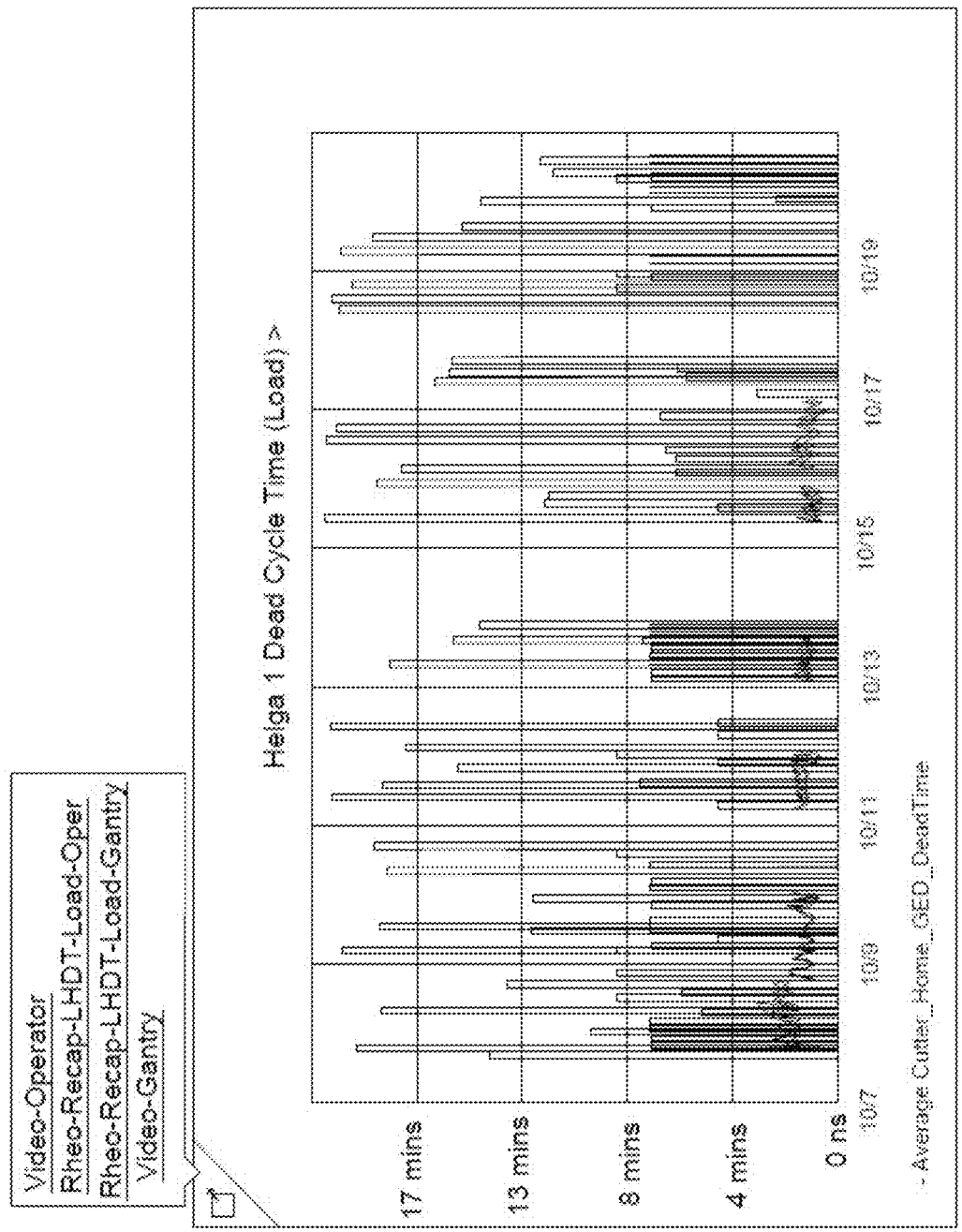

As illustrated in FIG. 19, the system may provide video clips from multiple camera streams (to get the field coverage) corresponding to those specific epochs or other displayed metric.

Figure 20:
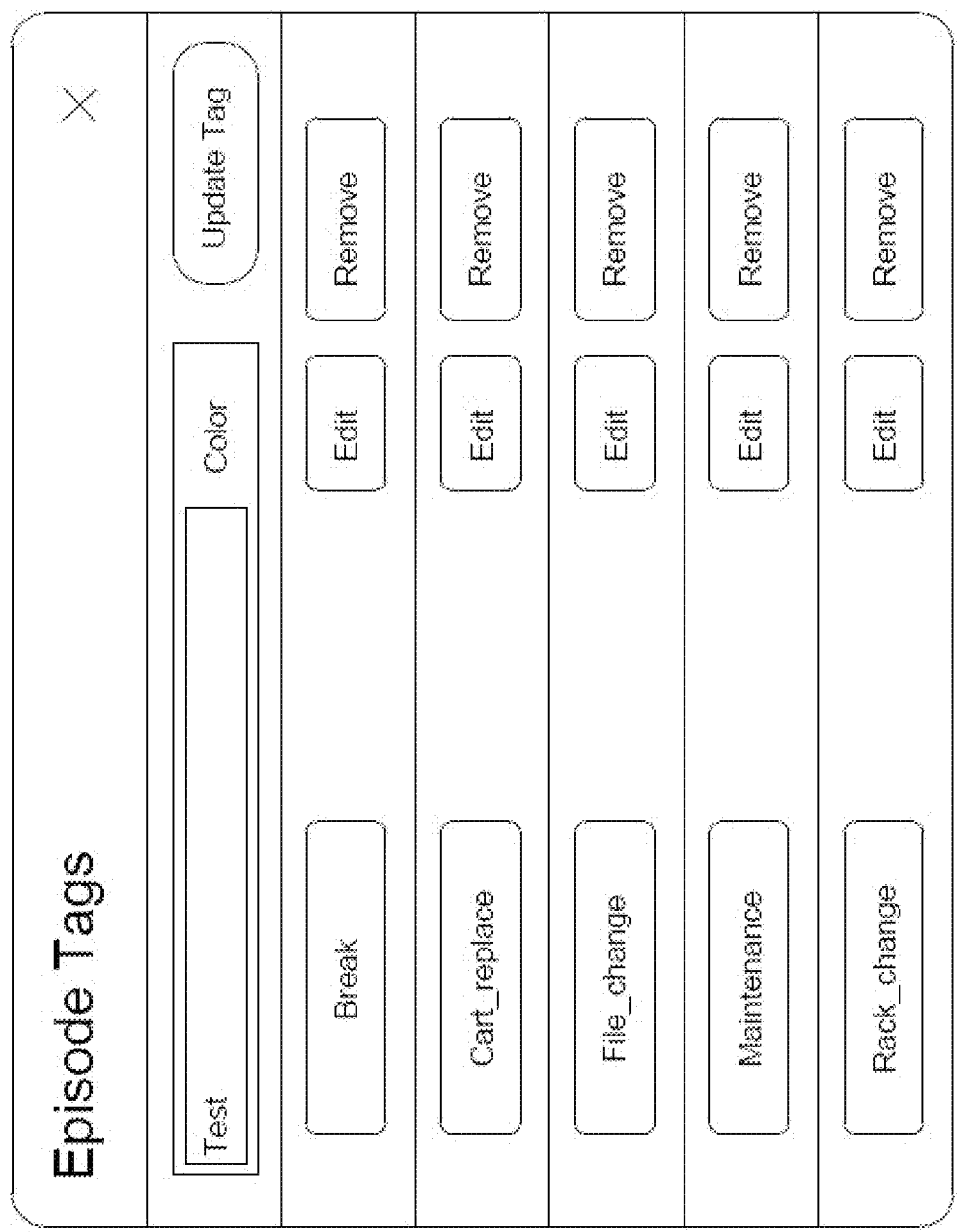

As illustrated in FIG. 20, the system may permit a user to create tags and apply a corresponding tag to specific videos or other metric time. The tags may be used to assist in machine learning to identify metrics, issues, and causes in future iterations. The system may be configured to automatically tag the videos by learning from tags associated by users to videos using the Pre-Processor Blocks, Instantaneous Snap-Shot Processing Blocks, Time-Dependence Processing Blocks etc. The human and machine interaction may be used to complement each other, to improve the accuracy and automation of the tagging system.

According to exemplary embodiments, tags may be assigned at different hierarchies. For example, a tag may be assigned based on an episode, such as to identify a root cause. A tag may be assigned across a time duration, such as an hour or a day, or a duration of use of a resource (such as a personnel shift). Tags may provide specific information about the associated time, such as a root cause of an episode. Tags may provide general or summary information about the associated time, such as whether targets were met during the associated time or not.

Figure 21:
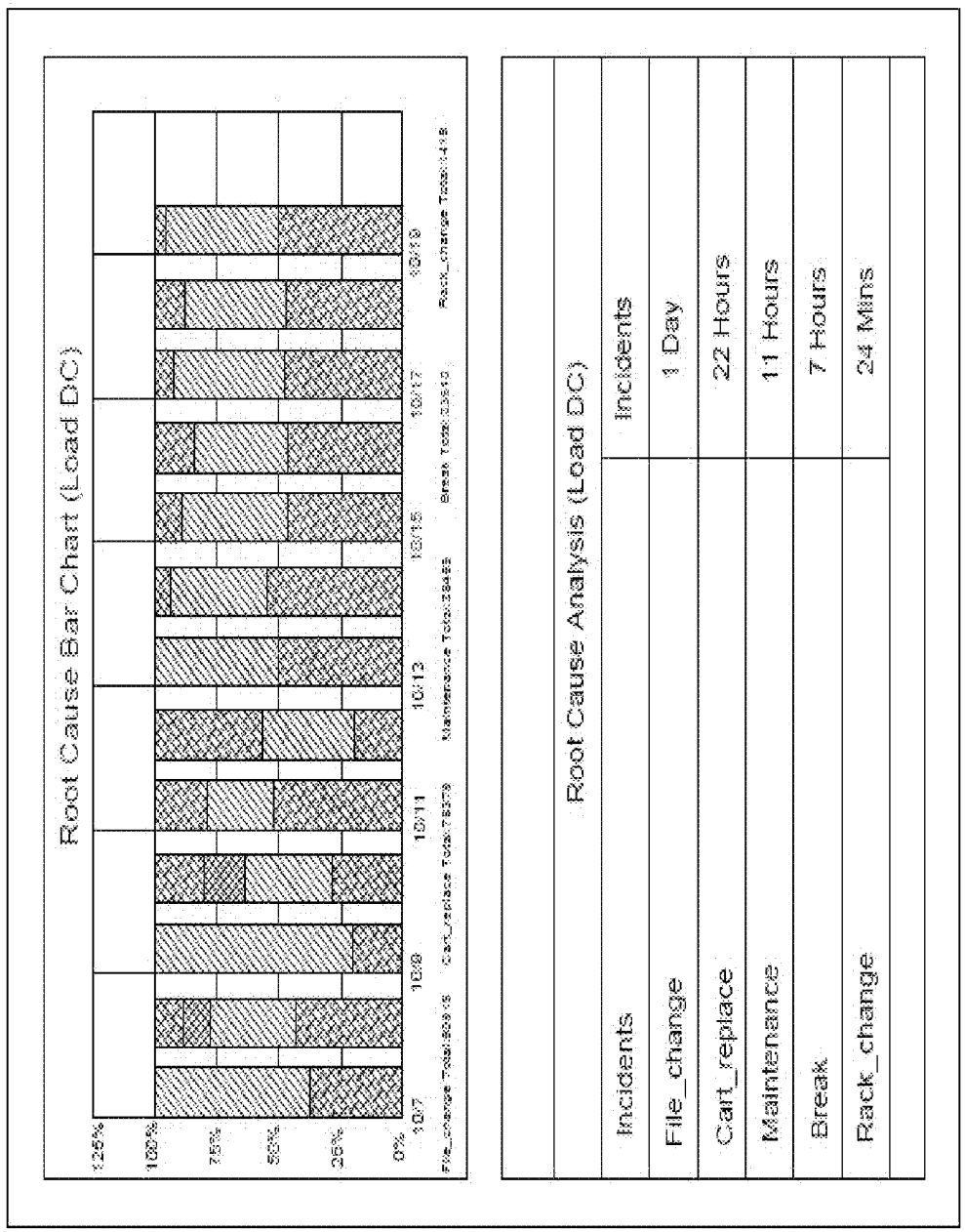

As illustrated in FIG. 21, exemplary embodiments may automatically provide a chart of the root causes using either user entered or automatically generated tags. Exemplary embodiments may provide video playback at variable speed or permit a user to set a speed control to quickly view a video or compiled video clip(s). In an exemplary embodiment, the system may be configured to provide a summary video that stitches all selected, desired, tagged, or other compilation of videos into a single or a few videos that summarizes the events for a longer time (e.g., day, shift) in one video. Compilations may include different feeds from simultaneous sources and/or may include feeds in time durations. Exemplary embodiments may be used to simulate the effects of removing the root causes of an identified inefficiency.

Exemplary embodiments of the system described herein may provide rapid improvement scenarios and provide corresponding rapid impact analysis. Conventionally, when the efficiency of a process is being assessed, a number of people are involved and the process is reviewed for a duration, the number of people identify potential causes, the process is redesigned to address the identified causes, and the process is re-evaluated with the new redesign, which can take weeks. Exemplary embodiments of the system described herein may accomplish similar results in a much shorter period, such as in a matter of hours. Exemplary embodiments may be used to monitor a process over a period of time. The system may be configured to identify information about the process, such as an indication of a percentage of its efficiency (such as the percentage of time that the process is operating within target parameters), an average cycle time (such as for making a part or using a specific piece of equipment), an average dead time (such as for a specific piece of equipment), etc. The system may be used, such as through the use of the user interfaces, the identification of events, the identification of root causes of events, and combinations thereof to identify inefficiencies quickly and identify root causes of inefficiencies in the system. Changes may be implemented and new information may be obtained about the newly implemented process. For example, timelines from before and after the changed process may be visualized and directly compared. After changing parameters, the system may provide updated information about the process. The updated information about the process may be along the same parameters as the original information about the process and/or may be a comparison between the updated information and the original information.

The system may therefore provide a specific quantifiable analysis of improvements of the process by making changes within the process. For example, when a change is implemented, the system may be able to determine an improvement in downtime of a machine, and/or an improvement of through put, etc. and therefore provide an increases in efficiency or overall output of a process. The increase may be equated to specific output of the process and associated value to the change. The system may therefore be able to provide insight into the gains of specific process decision to directly compare and analyse whether any costs associated with a proposed change is ultimately worth the gains achieved by the proposed change. The duration for making such assessments can be reduced substantially as inefficiencies can be identified in a matter of minutes or hours, proposed changes provided thereafter, and observation of newly implemented processes within hours or days to determine the respective effects on the process.

Exemplary embodiments include systems and methods for rapidly assessing a process and/or providing impact analysis on proposed changes to the process based on the assessment of the process. The system and methods may include one or more cameras, analyzing the received data from the one or more cameras, analyzing the received data to identify inefficiency events within a process, and visualizing the identified inefficiency events. The system and method may include associating one or more performance metrics to the process. The method may include users of the system and/or the system identifying potential solutions to identified inefficiency events, and implementing a modified process based on the identified inefficiency events and/or the potential solutions to the identified inefficiency events. The system and method may include using the one or more cameras to analyze received data of the modified process and determining updated the one or more performance metrics to the modified process. The system and method may be used to determine whether to implement the one or more changes made between the modified process and the original process based on a comparison of the one or more performance metrics from the original process to the updated one or more performance metrics from the modified process.

The system and methods may include one or more cameras, analyzing the received data from the one or more cameras, analyzing the received data to identify inefficiency events within a process, and visualizing the identified inefficiency events.

Exemplary embodiments include system and methods for visualizing a process. The method may include receiving data from one or more data sources, including one or more cameras; analyzing the received data; and visualizing the analyzed data. The system may include one or more cameras configured to be positioned about an area in which a process occurs. The system may also include a communications system for the cameras to communicate to a hub, computer, network, each other, and/or a combination thereof. The system may include a processor for analyzing data received from the one or more cameras. The system may include a display or other visualization or notification device, such as a light, speaker, etc.

In an exemplary embodiment, the system may method may be configured to provide an integrated system of cameras for large area monitoring. For example, the cameras may be distributed to obtain a wide area perspective of one or more actions, activities, events, supplies, products, services, etc. within the process. In an exemplary embodiment, the received data may be preconditioned to improve a signal to noise ration.

In an exemplary embodiment, the analyzing of the data within the system or method may include algorithms for improving the efficiency of the data processing. For example, the data from multiple signals (whether form the one or more cameras or from one or more other sensors, and any combination thereof) may be combined into a single snap shot for processing within a single processing frame. For example, at least two images from the one or more cameras may be aggregated into a single processing frame. The aggregation of signals into a single processing frame may reduce the bandwidth of data processed and/or transmitted within the system.

The system and method may include different combinations of aggregated processing information. For example, a first data source creates a first data stream of sequential images and a second data source creates a second data stream of sequential images and the single processing frame comprises a first image from the first data stream and a second image from the second data stream, wherein the first image from the first data stream and the second image from the second data stream correspond to a simultaneous time. As another example, the received data may be aggregated to generate a first single processing frame including at least two images from the one or more cameras and a second single processing frame includes at least two other images from the one or more cameras, and the second single processing frame includes at least two other images at a later time than the at least two images from the first single processing frame.

In an exemplary embodiment, the analyzing of the data within the system or method may include algorithms for improving the efficiency of the data processing. For example, the incoming data may be used to analyze or predict attributes of the data. Within a single processing frame, one portion of the single processing frame may be used to predict information about another portion of the single processing frame. In an exemplary embodiment, the system and method includes determining an area of interest from a first single processing frame to predict an area of interest in a second single processing frame. Within sequential single processing frames, one portion of a first processing frame may be used to predict information about a second single processing frame. Please include one portion of a first processing frame may be used to predict information about the same frame.

The system and method may use any combination of predictions to assist in analyzing the data. For example, the predicted information may be a presence or absence of an object. If an object, such as a worker, is identified in one portion of an image frame at a given time, then the system may first analyze a portion of the frame corresponding to the same location of a subsequent image from a later point in time to determine whether the worker is still at the intended location. If the worker if found, then the system reduces the analyses of the remaining frame as it has already found its intended object of observation. Conversely, if the object, i.e. the worker, is missing from the same location of the subsequent image from the later point in time, then the system may thereafter further analyze the frame to detect a new location of the worker. In even later subsequent frames, the system and methods may use a combination of previous positioned to predict a new position in the later subsequent frame based on prior movement, direction, duration, etc. As another example, the system may track a duration of an action within the process, the system may also be able to detect a start of the action, and therefore use the duration to predict an end of the action. The system and method may use the start and end times of the action to also predict a location of resources corresponding to the start and end of the action.

In an exemplary embodiment, the analyzing of the data within the system or method may include algorithms for improving the efficiency of the data processing. For example, the system may be configured to determine a present state of the process and predict a subsequent state and/or adjust an analysis of the data based on the present state, past state, predicted state, and combinations thereof. For example, a process may have many states, including whether a resources is in position, in use, out of use, out of commission, in a transition, and combinations thereof. Other states may include whether a set of resources (such as inventory) is sufficiently supplied, low, or depleted. The state may be used to analyze the given data. For example, if a given machine is in an in use state, and it runs autonomously for a duration, the system and method may be configured to reduce a fidelity or monitoring of that resource during the automated in use duration. The system and method may monitor for an exception case only, such as an indicator to show the machine is not working (e.g. monitoring for whether the machine is running, within temperature range, etc.), but does not require the more detailed analysis to detect other attributes. For safety protocol monitoring, the system may only detect the incoming information to determine whether there is personnel present within a predefined area while the machine is running. The system may therefore reduce the fidelity (either in time or image resolution) based on a given state. The system may also use the state to predict the next actions, such as when the machine will transition and increased monitoring is desired.

In an exemplary embodiment, the one or more data sources includes at least one data stream of sequential images and the analyzing the received data comprises defining a state based on an image of the sequential images. The state based determination may include determining a location of an object within a region of the image. Other state based determinations may include, for example, a condition of a resources, such as a machine, part, component, inventory, etc. The condition may include whether a resource is in use, in transition, broken, out of use, etc. The analysis of the data may also include using the state to predict an area of interest in a second image in the sequence of images, and the second image occurs later in time than the image. The prediction may be for example that a resource (such as a part or personnel) should be in a desired location after the completion of an action determined by the state. The analysis may further include determining a conformity of persistence of the state from the image to a second image form the one or more data sources. In this case, for example, the system and method may observe a desired resource at a first location and predict the desired resource's at the same location in a subsequent time. The system may determine whether the desired resource actually conforms to the state (i.e. stays in the same location). Other conformity of persistence of the state may include whether a resource stays in use, stays out of use, stays in a transition, is moving, is stationary, is in a desired location, is sufficiently supplied (such as for inventory), is in insufficiently supplied (such as for low inventory), etc. In the event the system and method determines that the state is no longer persistent (i.e. the conformity of persistence of a state is negative), then the system and method may then detect a transition from a first state to a second state or detect the second state.

In an exemplary embodiment, the system may use the states, predictions, aggregated data, areas of interest, analyzed data, object detection, among other analytic tools to keep track a metric corresponding to the process. The metrics may be any attribute of interest, such as, for example, in use time, down time, transitions, quantity per duration, cycles per duration, duration between transitions in state, number of transitions in state over time, types of transitions, types of states, and any combination thereof. The metric may correspond to a conformity of persistence of a given state.

In an exemplary embodiment, the system and methods may use the states, predictions, aggregated data, areas of interest, analyzed data, object detection, and other analysis to dynamically adjust the fidelity of the data being analysed. The fidelity of the data may be in time, such as fewer or greater number of image frames or sampled data points are retrieved and/or analyzed in a given time duration, or in data, such as in the resolution of the image or signal. For example, an area of an image not of interested may be reduced in data resolution, while areas of interest may be retained and/or increased in data resolution. For periods when a state is expected to remain static, the time fidelity of the data may be reduced, in that fewer data points/images are observed or analyzed over a given period of time. In other words, the sample rate may be reduced.

Embodiments of the system and method may therefore adaptively vary a fidelity of the received data based on meta information, user inputs, processed outputs from one or more signal sources, or combinations thereof. For example, when a sensor indicates an increase in temperature that may indicate a concern, the fidelity (either in resolution or sampling rate) may be increased. Other inputs may include user inputs, such that a user may indicate heightened areas of interest or concern, actions within a process, locations within a process, that may increase or decrease the fidelity of the data analyzed.

In an exemplary embodiment, the one or more data sources includes at least one data stream of sequential images and the analyzing the received data comprises defining an area of interest in an image of the sequential images. A fidelity of data of the image may be changed based on the area of interest. The fidelity of a signal resolution may be reduced in an area of lesser interest than the area of interest. A single processing frame may be generated from two or more images from the one or more data sources, and the fidelity of data of the single processing frame may be reduced by increasing a time separation between the two or more images (i.e. decreasing the sampling rate). Varying the fidelity may include removing portions of data corresponding to areas of an image not under observation and/or enhancing other portions of the image that are of interest at a particular time of analysis. The areas not under observation and areas of interest may change over time based on an updated meta information, updated user inputs, updated processed outputs from one or more signal sources, or combinations thereof.

In an exemplary embodiment, the system and method may permit different visualization of the analyzed data. For example, the system may include a display system for providing visual feedback to the user. The user display may permit the process to be represented in steps, resources, or other categorical relationship. The user display may permit the each segment of the represented process to include an indication of a delay attributed to that segment. The visualization may also include information about the segment, such as the resources used, a metric corresponding to the segment, and combinations thereof.

In an exemplary embodiment, the visualization may permit a user to display a user interface on a display. The user interface may include one or more video segments that may be played from the one or more cameras based on the analyzed data. Exemplary video segments may be aggregated according to an identified event. For example, a user may want to observe when a resource is not being utilized, or when an inefficiency event is detected. In an exemplary embodiment, the user interface may include different visuals areas, such as one for playing the video clips, and one for providing a listing of a plurality of different video segments corresponding to different time segments having a same identifying event. The listing of a plurality of different video segments may also correspond to different time segments with each time segment being identified as any of a plurality of events.

In an exemplary embodiment, visualizing the data may include displaying a user interface on a display and the user interface includes displaying a graph of a metric generated from analyzing the received data. The system and method may also include receiving from a user an input corresponding to a location of the graph of the metric and displaying a video segment from the one or more cameras based on the received input. The visualization may further includes displaying a series of video segments from the one or more cameras corresponding to time interfaces on the graph for instances in which the metric is above or below a threshold. The series of video segments may also be selected based on any combination of desired attributes, such as an identity of the event, meta information, user inputs, processed outputs from one or more signal sources, the states, predictions, aggregated data, areas of interest, analyzed data, object detection, a value or relative value of a metric, or combinations thereof.

In an exemplary embodiment, the system and method may be configured to play two or more video segments from two or more cameras, or two or more video segments from the same camera simultaneously. The simultaneous playing of video clips may permit a complete representation of an event. The selection of the multiple video segments may be based on the analyzed data and/or in an identity of an event or combinations thereof. For example, if the analyzed data indicates a resource is not identified in a camera image, another camera image that has analyzed data indicating the resource is in the other camera image may be simultaneously displayed to a user to indicate that a resource is out of an expected location and to display where the resource actually is and how the resource is actually being utilized. As another example, an event may be determined such as a transition state, e.g. reloading of a machine, which may implicate multiple camera views to fully review and observe the actions corresponding to the event. Therefore, the user interface may include more than one video segment from one, two, or more cameras based on an identity of the event, meta information, user inputs, processed outputs from one or more signal sources, the states, predictions, aggregated data, areas of interest, analyzed data, object detection, metrics, or combinations thereof.

In an exemplary embodiment, the system and method may be configured to analyze the received data and improve and/or quantify the performance of the process. The system and method may be configured to detect one or more events and/or inefficiencies. The system and method may be configured to attribute a process delay to a segment of the process. The system and method may be configured to analyze the detected one or more events and/or inefficiencies and/or the process delay of each segment of the process to determine an overall efficiency of the process. The system and method may be configured to simulate effects of reallocation of resources and/or reorganization of process segments in order to provide an improvement in the process. An improvement may be based on any desired attribute, such as reducing resources, improving process time, increasing or decreasing machine up or down time, or to get the resources, and process segments into a desired attribute configuration.

Exemplary embodiments provided herein may include a search feature. The search feature may be configured to receive an input from a user. The input from the user may be through a user interface, such as a display, touch screen, keyboard, button, mouse, and combinations thereof. The user may, for example, type in a desired term or terms to search, the user may, for example, select from a drop down menu of a list of available options, or the user may provide other or a combination of inputs to the system. The system may be configured to take the input from the user and search on information within the system. The search feature may be used, for example, to identify episodes having a common root cause. The search feature may be used, for example, for identifying specific types of episodes. The search feature may be used, for example, for identifying episodes involving a specific or the same resource. The search feature may be used to identify episodes within a given time frame or of a given duration or less than or greater than a given duration. The search feature may be used to find matches based on a criteria, unmatches based on a criteria (such as events that do not match a given criteria), find criteria based one conditions, such as greater than, less than, before, after, equal to, etc. Exemplary embodiments, may therefore provide a database of information that may be searched and provide a set of results based on the search. Exemplary embodiments, may include tags associated with episodes, time durations, etc. as described herein. The system may then be configured to search on the tags and find the associated episodes, time durations, etc. that are associated with the tags. The system may also or alternatively track other information associated with an episode, time duration, etc. such as, for example, the resources involved, such that similar searching may be conducted on different parameters. Exemplary embodiments may, therefore, be provided to permit a user the ability to search/filter across episodes for specific events based on tags, duration of episodes, time of occurrence, performance thresholds, etc., and any combination thereof.

In an exemplary method, the system may be distributed including one or more cameras to observe a segment of the process. The method may further including using the observation and analyzed data from the one or more cameras to distribute additional sensors. If the analysis identifies locations of inefficiency within the process, the distribution of sensors may be about the locations of inefficiencies. The analysis of received data may include identifying an inefficiency, wherein an inefficiency is determined by an underutilized resource because of a branch in the process with one side of the branch creating a lag compared to another side of the branch. The analysis of received data may include identifying a root cause of the inefficiency. In an exemplary embodiment, a plurality of branches may generate data such that the analysis of the received data corresponding to a plurality of branches may be analyzed to identify a series of inefficiencies along the process at more than one branch. The system and method may be configured to generate an optimized process order in which at least one of the series of inefficiencies is reduced to improve an overall process efficiency. The system and method may include receiving an input from a user and analyzing the received data to define and identify an inefficiency based on the input. The input may correspond to a desired process improvement, such as to change the use of resource(s), change the processing time, etc. The method may further include analyzing branch points from an end of the process toward the beginning of the process to sequentially optimize the process.

In an exemplary embodiment, the system and method may include simulating effects based on changes made to the process. For example, the system may automatically generate variations of the process and/or may receive an input to generate variations of the process. Variations may include any attribute, such as relocation of resources, reorganization of process segment, adding or removing process segments, reallocation of resources, adding or removing resources, etc. Exemplary embodiments may therefore include simulating a process flow with a change in a process step and the analyzing received data further includes determining a process flow metric with the change, and the visualizing the received data further includes providing an estimate of a process flow with the change. The system and method may include receiving an input from a user through a user interface, and changing the process flow based on the user interface and predicting a resulting production performance based on the input.

In an exemplary embodiment, the system may be used to provide information to one or more users and/or process resources through an indicator. The indicator may be visual and/or audial. For example, an indicator may be used to identify when a resource is over or under-utilized and thus provide an indication when resources should be reallocated. If one resource is underutilized, such as a worker waiting on a part to arise, the system may be provided to indicate that the resource may move to another segment of the process that is could use assistance. Visual indicators may be used, such as colored lights to indicate when a resource should leave one area and go to another area, other indicators such as symbols, text, displays, audial instructions, sounds, buzzers, etc. may also be used. The system and/or method may therefore be configured to analyze the received data and determine when a resource within the process is under or over utilized, and the method/system provides a real time adaptive indicator for indicating when a resource is underutilized to reallocate the resource.

As described herein, the system and methods may be used to identify a root cause of a condition within the process. The system and methods may receive an indication of a root cause from a user, and/or analyze the received data to determine a root cause. In an exemplary embodiment, the system is configured to receive and/or assign tags to data corresponding to a root cause. In an exemplary embodiment, the system may include a user interface for receiving an input from a user, and the system may display a video section from the one or more data sources; and receive a tag input from the user through the user interface, wherein the tag corresponds to a root cause of an inefficiency. The system may automatically determine a root cause of another inefficiency based on the tag corresponding to the root cause of the inefficiency. The system and method may determine a root cause of an inefficiency detected from the analyzed received data. The root cause may be identified by a tag associated with a video section of the one or more data sources. The event may also be identified by tagging associated video clips from the one or more data sources corresponding to the event. For example, if the system may detect that a worker is not in a desired station when a machine is normally or available to be in use, a user may observe a video clip associated with the non-use of the machine and indicate a tag of employee missing. The system may also be programmed to recognize the missing resource and provide the appropriate tag. The system may also learn from prior tags and determine that a missing resource receive a specific tag and then suggest a tag for video segments having similar states, conditions, and/or attributes.

Exemplary embodiments of the present system and methods may have multiple uses. As primarily described herein, the system and method may be used to observe a process efficiency and/or improve a process efficiency based on a desired objective (such as reducing resources, improving process time, improving machine working time, reducing waste, etc.). However, exemplary embodiments described herein may be used for many other objectives. The system and methods may be used to observe and critique resources (such as for personnel evaluations). The system and methods may be used for training. The systems and methods may be used for process monitoring, recording, quality assurance, quantification, etc. In an exemplary embodiment, the system and methods described herein may be used for monitoring inventory to determine a time to restock. The system may receive data about a supply of a resource and may analyze the received data to predict a time to exhaust the inventory. The system and methods may include additional features, such as an interface for automatically submitting an order or providing a notice to reorder the inventory. Exemplary embodiments described herein may also be used for quality assurance and/or monitoring a condition of a service or output from a process. The system and method may therefore analyze the received data to detect a level of quality of product produced by the process. Similarly, the system and method may analyze the received data to determine a level of quality of a service provided by the process. The analysis of the received data may also determine a level of compliance to a safety or specific process protocol. The system may, for example, monitor the received data for specific conditions, such as employees wearing safety gear in one or more areas. The system may, for example, monitor other conditions and states for compliance and providing indications, notices, reports, etc. corresponding to the analyzed data. Other conditions may also be used to define a specific process protocol. For example, a camera for observing temperature may be used to observe a temperature of personnel and/or equipment. The system may then observe a temperature relative to the object detected and a temperature threshold. For example, for observing personnel, the system may identify a temperature profile as belonging to a person and then measure the temperature against a threshold. The threshold may be used to determine if the personnel is working under good conditions, such as without fever, or to observe or avoid heat stroke. Other conditions may also be observed, such as safety spacing, space capacities, presence or absence of safety equipment, operation within safety limits, etc.

In an exemplary embodiment, a method of determining inefficiencies in a process, is provided, including providing one or more devices for generating time based data strings, including one or more cameras, processing the received data, analyzing the received data, and visualizing the processed and analyzed data. The method may further include positioning the one or more devices at an end process branch toward an end of the process path; determining an inefficiency in the process based on an observation of resources used at the end process branch; repositioning the one or more devices at an upstream process branch further upstream in the process path; determining an inefficiency in the process based on an observation of resources used at the upstream process branch; positioning one or more other devices at an upstream process branch further upstream in the process path; determining an inefficiency in the process based on an observation of resources used at the upstream process branch; and combinations thereof. The system and method may also prioritise an inefficiency in the process based on the end process branch over the upstream process branch.

Exemplary embodiments of the system may include automated intelligent bots for performing one or more functions described herein. For example, the automated intelligent bots may be configured to identify an episode, to determine the root cause of episodes, to tag episodes, make other analysis or associations described herein, provide and/or control the indicators, make recommendations, run simulations, etc.

Exemplary embodiments of the systems and methods described herein may include many applications and provide many benefits within that application. Exemplary embodiments provided herein include an intelligent integrated management system. The management system may include tiered operational performance dashboard, and a system of cameras, detectors, sensors, and combinations thereof to provide 24 hour, 7 day a week process oversight with abnormal condition notification. The system may provide management by exception instead of management by events, and provide a normalized and standardized operation across facility and across a company.

For example, for manufacturing, the system may provide, detect, determine, analyze, and/or improve: asset overall equipment effectiveness; root cause identification and prioritization; workflow optimization (automated line balancing); time to completion prediction and simulations; among others.

For quality assurance, the system and methods may permit yield monitoring and estimation, rework/scrap monitoring, automated defect identification.

For supply chain applications, the system and methods may be used for inventory monitoring and replenishment notifications, forecasting of inventory stock utilization and warehouse layout optimization.

For safety compliance, the system and methods may provide personal protective equipment verification, proximity monitoring or compliance monitoring and violation notification.

Exemplary embodiments described herein may be used in employee programs. The employee programs may be used in evaluating an employee during review. The employee program may be used in providing rewards and/or bonuses, such as in identifying an employee of the month or other recognition system. Exemplary embodiments may be used to identify and quantify the production of an employee and/or resource. The system may be configured to display the results as compared against other employees and/or resources. For example, the top five or ten production personnel may be identified and ranked. The system may display the results so that employees may be recognized, rewarded, and/or used to motivate each other. The system may be configured to assess, track, and apply benchmarks to the quantitative performance metrics of an employee. For example, in an employee reaches certain benchmarks, the system may be configured to determine, and record when the benchmark is reached and/or surpassed. The system may be configured to provide a notice of such events, and/or may be configured to communicate with another system, such as payroll or accounting to indicate the employee is eligible for a bonus or monetary reward. Exemplary embodiments described herein may therefore provide, automated and/or manual rewards, recognitions, and appreciations program to users for active use and performance outputs.

Exemplary embodiments described herein may provide an interface to communicate with other systems and/or provide a marketplace for different entities. For example, once the system has determined or received an input to identify the source of an episode, such as latency within in line because a machine (or any resource) is not available, the system may provide the user to search for, post, purchase, or otherwise communicate the need for the machine.

Exemplary embodiments may bring together or interface with other platforms and/or users. The system may provide the collaboration between different users that may have access to the system. The system may therefore permit different users to collaborate on a given episode, event, or other condition or information in the system. For example, the system may provide a chat channel for users to discuss episodes. The system may provide different users to provide comments, feedback, suggestions, etc. on a given episode. Exemplary embodiments, may permit a user to send messages or notices to installers, operational consultants, manufacturers, vendors, etc. to obtain necessary equipment to remedy a given root cause of an episode. The system may therefore provide a market place for installers, operational consultants, manufacturing automation/hardware/equipment vendors, etc. The system may provide an interface to another program for searching for and/or purchasing the necessary goods/services to remedy the root cause of an episode and/or may integrate the marketplace directly into the platform.

Exemplary embodiments of the system described herein can be based in software and/or hardware. While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realising the invention in diverse forms thereof.

The invention claimed is:

1. A method of visualizing a process, comprising:
receiving data from one or more data sources, including one or more cameras;
analyzing the received data to identify one or more inefficiency events in the process; and
visualizing the analyzed data,
wherein the visualizing the analyzed data includes displaying a user interface on a display and the user interface includes a timeline of video segments and permits a user interface input to zoom in and out, wherein the timeline that is zoomed out provides an indicator of a total number of inefficiency events and corresponding time effect based on the total number of inefficiency events, and the timeline that is zoomed in provides a second indicator of the identity of the inefficiency event and an associated duration of the inefficiency event on the zoomed in timeline.

2. The method of claim 1, wherein the user interface includes a video segment from the one or more cameras based on the analyzed data identifying an identity of the inefficiency event.

3. The method of claim 2, wherein the user interface also includes a listing of a plurality of different video segments corresponding to different time segments having a same identity of the inefficiency event.

4. The method of claim 2, wherein the user interface also includes a listing of a plurality of different video segments corresponding to different time segments with each time segment being identified as any of a plurality of different identities of the inefficiency events.

5. The method of claim 2, wherein the user interface includes more than one video segment from two or more cameras based on the identity of the inefficiency event.

6. The method of claim 1, wherein the user interface comprises a plurality of timelines, wherein each timeline is associated with different data from different one or more data sources.

7. The method of claim 1, wherein the visualizing includes displaying a different user interface on a display and the different user interface includes displaying a graph of a metric generated from the analyzing the received data.

8. The method of claim 7, wherein the visualization includes receiving from a user an input corresponding to a location of the graph of the metric and displaying a video segment from the one or more cameras based on the received input.

9. The method of claim 7, wherein the visualization further includes displaying a series of video segments from the one or more cameras corresponding to time interfaces on the graph for instances in which the metric is above or below a threshold.

10. The method of claim 1, further comprising using analysis of the received data to distribute sensors, and the analysis of the received data identifies locations of inefficiency within the process, and the distribution of sensors is about the locations of inefficiencies.

11. A method of visualizing a process, comprising:
receiving data from one or more data sources, including one or more cameras;
analyzing the received data to identify one or more inefficiency events in the process; and
visualizing the analyzed data,
wherein the analysis of received data comprises identifying an inefficiency, wherein an inefficiency is determined by an underutilized resource because of a branch in the process with one side of the branch creating a lag compared to another side of the branch.

12. The method of claim 11, wherein the analysis of received data comprises identifying a root cause of the inefficiency.

13. The method of claim 11, wherein the analysis comprises analyzing received data corresponding to a plurality of branches to identify a series of inefficiencies along the process at more than one branch.

14. The method of claim 13, further comprising providing an optimized process order in which at least one of the series of inefficiencies is reduced to improve an overall process efficiency.

15. The method of claim 14, further comprising receiving an input from a user and analyzing the received data to define and identify an inefficiency based on the input.

16. The method of claim 15, wherein the received input indicates a desired result including a reduction of resources, an improvement in process time, an improvement in resource usage, and combinations thereof.

17. The method of claim 11, further comprising analyzing branch points from an end of the process toward the beginning of the process to sequentially optimize the process.

18. The method of claim 11, wherein the visualizing includes displaying a user interface on a display and the user interface includes displaying a graph of a metric generated from the analyzing the received data, and includes receiving from a user an input corresponding to a location of the graph of the metric and displaying a video segment from the one or more cameras based on the received input.

19. The method of claim 18, wherein the visualization further includes displaying a series of video segments from the one or more cameras corresponding to time interfaces on the graph for instances in which the metric is above or below a threshold.

20. A method of visualizing a process, comprising:
receiving data from one or more data sources, including one or more cameras;
analyzing the received data to identify one or more inefficiency events in the process; and
visualizing the analyzed data,
wherein the visualizing the analyzed data includes displaying a user interface on a display and the user interface includes a timeline of video segments and permits a user interface input to zoom in and out, wherein the timeline that is zoomed out provides an indicator of a total number of inefficiency events and corresponding time effect based on the total number of inefficiency events, and the timeline that is zoomed in provides a second indicator of the identity of the inefficiency event and an associated duration of the inefficiency event on the zoomed in timeline, and
wherein the analysis of received data comprises identifying an inefficiency, wherein an inefficiency is determined by an underutilized resource because of a branch in the process with one side of the branch creating a lag compared to another side of the branch.

\* \* \* \* \*